United States Patent
Nakashima

(10) Patent No.: US 9,329,898 B1
(45) Date of Patent: May 3, 2016

(54) METHOD AND APPARATUS FOR JOB MANAGEMENT

(71) Applicant: FUJITSU LIMITED, Kawasaki-shi, Kanagawa (JP)

(72) Inventor: Makoto Nakashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/828,555

(22) Filed: Aug. 18, 2015

(30) Foreign Application Priority Data

Oct. 30, 2014 (JP) .................................. 2014-220910

(51) Int. Cl.
*G06F 9/46* (2006.01)
*G06F 9/50* (2006.01)

(52) U.S. Cl.
CPC .................................... *G06F 9/5027* (2013.01)

(58) Field of Classification Search
None
See application file for complete search history.

(56) References Cited

U.S. PATENT DOCUMENTS

| 2006/0101104 A1 | 5/2006 | Bhanot et al. |
| 2013/0152089 A1 | 6/2013 | Shimamura |

FOREIGN PATENT DOCUMENTS

| EP | 1580661 A1 | 9/2005 |
| JP | 2008-516346 | 5/2008 |
| WO | 2012/020474 | 2/2012 |

OTHER PUBLICATIONS

Extended European Search Report issued Mar. 16, 2016 in corresponding European Patent Application No. 15182489.3, 9 pages.
Agarwal, Tarun et al., "Topology-aware Task Mapping for Reducing Communication Contention on Large Parallel Machines", Proceedings, 20th International Parallel and Distributed Processing Symposium (IEEE CAT. No. 06TH8860), Apr. 25, 2006, pp. 1-10, XP010920417.

*Primary Examiner* — Gregory A Kessler
(74) *Attorney, Agent, or Firm* — Fujitsu Patent Center

(57) ABSTRACT

A computer sequentially selects, when receiving a job execution request specifying the requested number of nodes, an axis from the n axes of n-dimensional space (n is an integer of two or greater) forming a network where nodes are connected by mesh or torus interconnect. The computer gradually extends the width of a temporary range of coordinates of the selected axis from a prescribed value, and determines, as a range for the selected axis, the temporary range where the number of available nodes whose coordinates on each defined axis having a determined range fall within the range and whose coordinates on the selected axis fall within the temporary range is greater than or equal to the requested number of nodes. After determining ranges for all the axes, the computer determines which nodes to assign to the job from available nodes whose coordinates on each axis fall within its range.

8 Claims, 25 Drawing Sheets

X-DIRECTION MOVEMENT → y-DIRECTION MOVEMENT

| NODE GROUP UNIT | | 96 | 97 | 98 |
|---|---|---|---|---|
| | b=0<br>b=1<br>b=2 | | | |
| THE NUMBER OF AVAILABLE NODES | ALL | 10 | 0 | 0 |
| | b0 | 10 | × | 9 |
| | b1 | 10 | 9 | 9 |
| | b2 | 10 | 9 | × |

○ IDLE

● UNAVAILABLE

⊗ FAILED ROUTING FUNCTION

FIG. 22

THE REQUESTED NUMBER OF NODES: 250

DETERMINE RANGE FOR ASSIGNMENT WITH RESPECT TO AXIS 0

AXIS 0=0   AXIS 0=1   AXIS 0=2

AXIS 2

AXIS 1

THE NUMBER OF AVAILABLE NODES IN EACH NODE GROUP UNIT

THE NUMBER OF AVAILABLE NODES ON AXIS 0 = n:

- n=0 ⇒ 20
- n=1 ⇒ 90
- n=2 ⇒ 240

⇩

$s_0=1, x_0=0$ ⇒ 20 (INSUFFICIENT NUMBER OF NODES)
$s_0=1, x_0=1$ ⇒ 90 (INSUFFICIENT NUMBER OF NODES)
$s_0=1, x_0=2$ ⇒ 240 (INSUFFICIENT NUMBER OF NODES)
$s_0=2, x_0=0$ ⇒ 20 + 90 = 110 (INSUFFICIENT NUMBER OF NODES)
$s_0=2, x_0=1$ ⇒ 90 + 240 = 330 (ASSIGNMENT POSSIBLE)

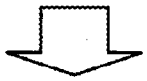

RANGE FOR AXIS 0: $x_0=1, s_1=2$

FIG. 23

THE REQUESTED NUMBER OF NODES: 250

DETERMINE RANGE FOR ASSIGNMENT WITH RESPECT TO AXIS 1

REGION FORMED BY $S_0 = 2$, $x_0 = 1$ DETERMINED FOR AXIS 0 IS MERGED

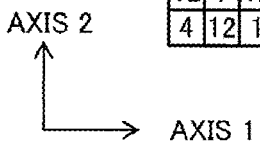

AXIS 2 → AXIS 1

THE NUMBER OF AVAILABLE NODES ON AXIS 1 = n:

- n=0 ⇒ 73
- n=1 ⇒ 89
- n=2 ⇒ 68
- n=3 ⇒ 48
- n=4 ⇒ 52

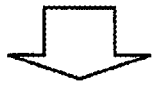

$s_1=1, x_1=0,1,\cdots,4$ ⇒ 73, 89, $\cdots$, 52 (INSUFFICIENT NUMBER OF NODES)
$s_1=2, x_1=0$ ⇒ 73+89=162 (INSUFFICIENT NUMBER OF NODES)
$s_1=2, x_1=1$ ⇒ 89+68=157 (INSUFFICIENT NUMBER OF NODES)
$s_1=2, x_1=2$ ⇒ 68+48=116 (INSUFFICIENT NUMBER OF NODES)
$s_1=2, x_1=3$ ⇒ 48+52=116 (INSUFFICIENT NUMBER OF NODES)
$s_1=3, x_1=0$ ⇒ 73+89+68=230 (INSUFFICIENT NUMBER OF NODES)
$s_1=3, x_1=1$ ⇒ 89+68+48=205 (INSUFFICIENT NUMBER OF NODES)
$s_1=3, x_1=2$ ⇒ 68+48+52=168 (INSUFFICIENT NUMBER OF NODES)
$s_1=4, x_1=0$ ⇒ 73+89+68+48=278 (ASSIGNMENT POSSIBLE)

RANGE FOR AXIS 1: $x_1=0$, $s_1=4$

FIG. 24

THE REQUESTED NUMBER OF NODES: 250

DETERMINE RANGE FOR ASSIGNMENT WITH RESPECT TO AXIS 2

REGION FORMED BY $S_1 = 4$, $x_1 = 0$ DETERMINED FOR AXIS 1 IS MERGED

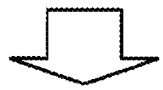

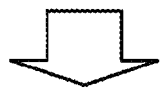

$s_2=1, x_2=0,1,2,3 \Rightarrow$ 71,63,79,65 (INSUFFICIENT NUMBER OF NODES)
$s_2=2, x_2=0 \Rightarrow$ 71+63=134 (INSUFFICIENT NUMBER OF NODES)
$s_2=2, x_2=1 \Rightarrow$ 63+79=142 (INSUFFICIENT NUMBER OF NODES)
$s_2=2, x_2=2 \Rightarrow$ 79+65=144 (INSUFFICIENT NUMBER OF NODES)
$s_2=3, x_2=0 \Rightarrow$ 71+63+79=213 (INSUFFICIENT NUMBER OF NODES)
$s_2=3, x_2=1 \Rightarrow$ 63+79+63=205 (INSUFFICIENT NUMBER OF NODES)
$s_2=4, x_2=0 \Rightarrow$ 71+63+79+65=278 (ASSIGNMENT POSSIBLE)

RANGE FOR AXIS 2: $x_2=0$, $s_2=4$

METHOD AND APPARATUS FOR JOB MANAGEMENT

CROSS-REFERENCE TO RELATED APPLICATION

This application is based upon and claims the benefit of priority of the prior Japanese Patent Application No. 2014-220910, filed on Oct. 30, 2014, the entire contents of which are incorporated herein by reference.

FIELD

The embodiments herein relate to a method and apparatus for job management.

BACKGROUND

In the field of High Performance Computing (HPC), a number of computers (hereinafter, referred to as nodes) are connected to perform parallel computing. Topology choices for connecting nodes include mesh interconnect and torus interconnect. The mesh interconnect is a topology where nodes are arranged in a plurality of axial directions in a mesh and adjacent nodes in each axial direction are connected to each other with a high-speed interconnect network. The torus interconnect is a topology where nodes are interconnected in a mesh topology and then both end-nodes of each axis are connected to each other. There are also a network topology where all axes are used in a mesh interconnect or a torus interconnect and a topology where some axes are used in a mesh interconnect and the other axes are used in a torus interconnect.

To jobs that are executed in the HPC, nodes are assigned to execute the jobs. While executing a plurality of jobs, the nodes assigned to each of the jobs may perform inter-node communication via a common node. In this case, simultaneous data communication for a plurality of jobs that share a communication route causes interference in communication. If interference in communication occurs, the communication takes a longer time than expected. If such interference in communication occurs many times, the jobs may not be completed within an expected time period.

To deal with this, there is a technique by which only a group of nodes that are adjacent to one another on a network and that form a submesh or a subtorus (rectangular shape) is selected and nodes in the node group are assigned to a job. In this technique, each job needs a submesh or a subtorus, which avoids interference in inter-node communication between different jobs.

As another technique for assigning nodes to jobs, there is a job management apparatus, for example. This job management apparatus efficiently searches for idle nodes forming a consecutive rectangular or cuboid shape as compute nodes to be assigned to a plurality of unit jobs. There is also a technique for optimizing problem layout on a massively parallel supercomputer.

Please see, for example, International Publication Pamphlet No. WO 2012/020474 and Japanese National Publication of International Patent Application No. 2008-516346.

However, in the case where a region for nodes to be assigned to a job is limited to a submesh or subtorus, all nodes in the submesh or subtorus needs to be idle (i.e., any nodes do not execute any jobs) in order to be assigned to a job. In this case, the following problem may occur: Although there are as many idle nodes as requested for a job in the network as a whole, the nodes may not be assigned to the job because a sufficient-sized submesh or subtorus is not generated. That is to say, the node resources are not used efficiently.

Nodes may be used efficiently if a region for nodes to be assigned to a job is not limited to a submesh or subtorus and any idle nodes are selectable and assignable to the job. This case, however, may cause interference in communication between jobs. There have been no techniques for minimizing degradation of performance due to interference in communication between jobs without limiting the region for nodes to be assigned to a job to a submesh or subtorus.

SUMMARY

According to one aspect, there is provided a non-transitory computer-readable storage medium storing a computer program that causes a computer to perform a process including: sequentially selecting, in response to a job execution request specifying a requested number of nodes for a job, an axis of attention for range determination from n axes of an n-dimensional space, the n being an integer of two or greater, the n-dimensional space forming a network where a plurality of nodes are connected by one of a mesh interconnect and a torus interconnect; gradually extending a width of a temporary range of coordinates of the axis of attention from a prescribed value based on n-dimensional coordinates and status information of the plurality of nodes, and determining, as a range of coordinates for the axis of attention, the temporary range in which a number of available nodes whose coordinates on each defined axis fall within a determined range of each defined axis and whose coordinates on the axis of attention fall within the temporary range is greater than or equal to the requested number of nodes, the status information indicating a status including whether each of the plurality of nodes is available, the defined axis being an axis whose range has been determined; and determining, after determining ranges of coordinates for all of the n axes, second nodes to be assigned to the job from first nodes whose coordinates on each of the n axes fall within a determined range of the axis and which are available.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 illustrates an example of comparison in the number of available nodes among communication rules;

FIG. 23 illustrates an example of how to determine a range for an axis 0;

FIG. 24 illustrates an example of how to determine a range for an axis 1; and

FIG. 25 illustrates an example of how to determine a range for an axis 2.

DESCRIPTION OF EMBODIMENTS

Hereinafter, embodiments will be described with reference to the accompanying drawings. Features of the embodiments may be combined unless they exclude each other.

First Embodiment

Figure 1:
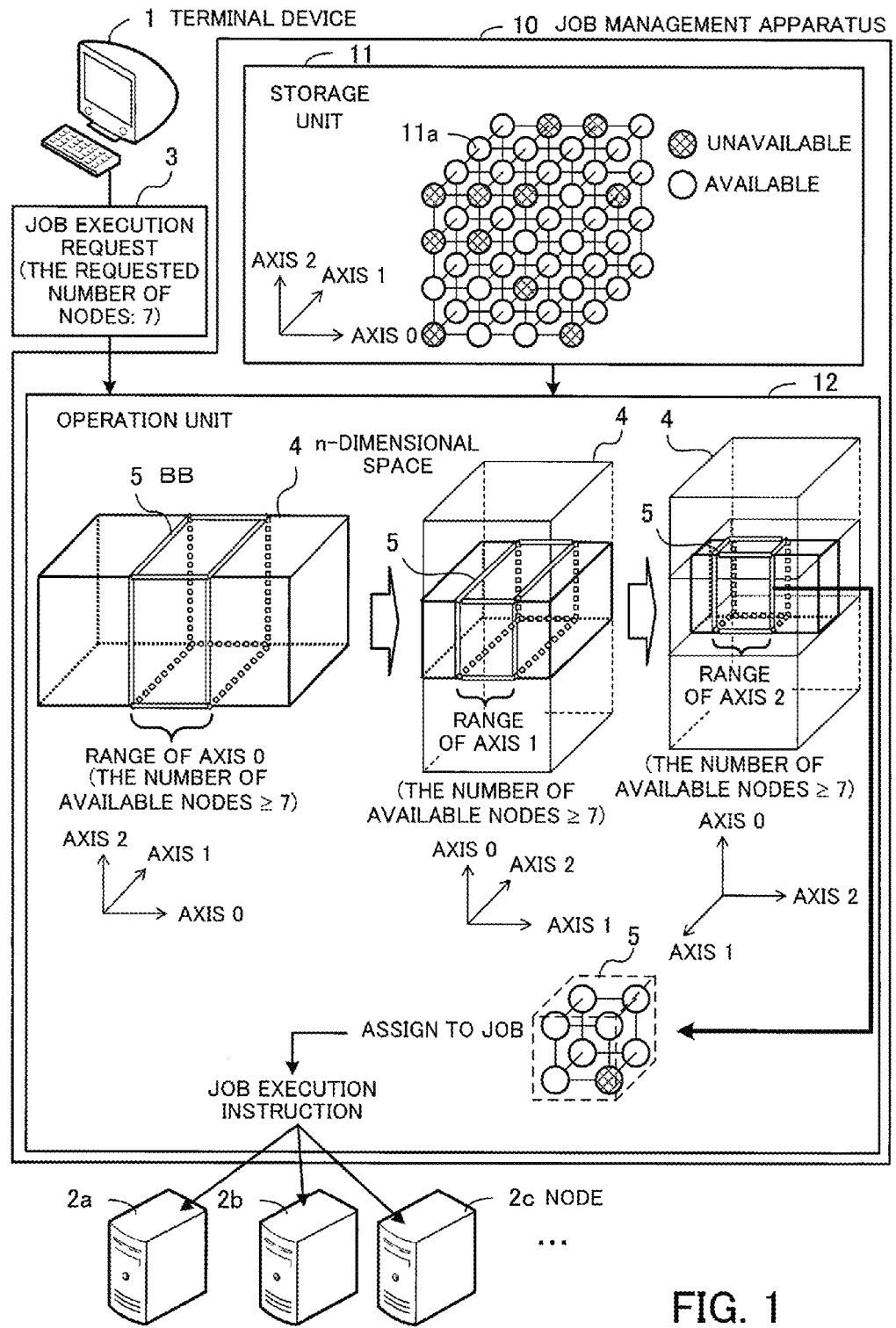
FIG. 1 illustrates an example of a job management apparatus according to a first embodiment.

FIG. 1 illustrates an example of a job management apparatus according to a first embodiment. A job management apparatus 10 is connected to a terminal device 1 and a plurality of nodes 2a, 2b, 2c, The terminal device 1 is a computer that is used by a user, for example. The plurality of nodes 2a, 2b, 2c, . . . are computers that perform the computation of jobs. These nodes 2a, 2b, 2c, . . . form an n-dimensional mesh or torus interconnection network (n is an integer of two or greater).

The job management apparatus 10 assigns as many nodes as the requested number of nodes specified by a job execution request 3 to a job, and causes the assigned nodes to execute the job. To this end, the job management apparatus 10 includes a storage unit 11 and an operation unit 12.

The storage unit 11 stores the n-dimensional coordinates of a plurality of nodes 2a, 2b, 2c, . . . and status information indicating a status including whether each of the plurality of nodes 2a, 2b, 2c, . . . is available. In FIG. 1, each circle mark 11a in the storage unit 11 represents a node. The position of a mark 11a indicates the coordinates of its corresponding node in the network. A line between the marks 11a represents a link between their corresponding nodes. Shaded marks represent unavailable nodes. For example, nodes executing jobs and nodes with failed processors are taken as unavailable nodes. Open marks represent available nodes. The status information may include information about whether a node has a failure.

The operation unit 12 sequentially selects an axis of attention for range determination from the n axes of an n-dimensional space 4 forming a network, in response to a job execution request specifying the requested number of nodes. The operation unit 12 then gradually extends the width of a temporary range of coordinates of the axis of attention from a prescribed value. At this time, the operation unit 12 counts the number of available nodes whose coordinates on each defined axis (which refers to an axis whose range has already been determined) fall within its determined range and whose coordinates on the axis of attention fall within the temporary range, on the basis of the coordinates and status information of the plurality of nodes 2a, 2b, 2c, . . . . For example, the operation unit defines a rectangular region that includes coordinates on each defined axis falling within its determined range and coordinates on the axis of attention falling within the temporary range. In the following description, this rectangular region is called a Bounding Box (BB). With respect to each undefined axis whose range is yet to be determined, a BB 5 includes coordinates falling within its entire range.

Then, the operation unit 12 finds and determines such a temporary range of the axis of attention that the number of available nodes is greater than or equal to the requested number of nodes, as a range of coordinates for the axis of attention. After determining ranges of coordinates for all of the axes, the operation unit 12 determines which nodes to assign to the job, from among the available nodes whose coordinates on the individual axes fall within the corresponding determined ranges. Then, the operation unit 12 sends a job execution instruction to the nodes assigned to the job.

As described above, when the above job management apparatus 10 receives a job execution request 3, the operation unit 12 searches for a BB 5 that includes as many available nodes as the requested number of nodes. To this end, the operation unit 12 sequentially determines ranges of coordinates for the axes. For example, assuming that these ranges are determined in the order of axis 0, axis 1, and axis 2, the operation unit 12 first extends the width of a temporary range of the axis 0 from a prescribed value (for example, one). For example, assuming that the temporary range of the axis 0 has a width of a prescribed value, the operation unit 12 determines whether the number of available nodes whose coordinates on the axis 0 fall within the temporary range is greater than or equal to the requested number of nodes (for example, "seven") for the job. If the number of available nodes is less than the requested number of nodes for the job, the operation unit 12 searches for a position of the temporary range where the number of available nodes is greater than or equal to the requested number of nodes for the job, by shifting the position of the temporary range along the direction of axis 0 without changing the width. If the position of the temporary range is shifted and all the shifted positions are where the number of available nodes is less than the requested number of nodes for the job, the operation unit 12 extends the width of the temporary range of the axis 0 and makes a search in the same way. Then, when the operation unit 12 first detects such a range that the number of available nodes is greater than or equal to the requested number of nodes for the job through the search, the operation unit 12 determines the found range as a range of coordinates for the axis 0.

After determining the range of coordinates for the axis 0, the operation unit 12 makes a search in the same way for the axis 1, thereby determining a range of coordinates for the axis 1. The operation unit 12 further makes a search in the same way for the axis 2, thereby determining a range of coordinates for the axis 2. Each time a range of coordinates is determined for an axis, the region of the BB 5 becomes smaller. Referring to the example of FIG. 1, for example, the BB 5 formed by the ranges of coordinates determined for all the three axes has a width of only two with respect to each of the axes. Available nodes included in the BB 5 are assigned to the job. Then, a job execution instruction is issued to the assigned nodes.

Assignment of nodes to a job in this way makes it possible to use the nodes in the network efficiently. That is, unavailable nodes that are executing other jobs are allowed to exist in the BB 5, and therefore extending the temporary range of each axis in the BB 5 ends up including all available nodes in the BB 5. Even if as many available nodes as the requested number of nodes specified by a job execution request 3 are scattered at remote distances, it is possible to assign these nodes to a job.

In addition, since the job management apparatus 10 of the first embodiment gradually extends the width of a temporary range of each axis from a prescribed value, it is possible to find the smallest BB that includes available nodes more than or equal to the requested number of nodes. Finding a small-sized BB 5 leads to a short distance between nodes to be assigned to a job. A shorter distance between nodes to be assigned to the job increases the efficiency of inter-node communication and reduces the possibility of occurrence of interference with other inter-node communication performed for other jobs. As a result, the execution efficiency of jobs increases.

Further, the operation unit 12 may be designed to determine whether all-to-all communication is possible between the available nodes in a BB 5 after ranges of coordinates are determined for all axes. In this case, the status information stored in the storage unit 11 includes information indicating whether each of the plurality of nodes has a failure. After the ranges of coordinates are determined for all the axes, the operation unit 12 determines whether the all-to-all communication between the available nodes in the BB 5 is guaranteeable, on the basis of the positions and status information of the plurality of nodes. For example, it is confirmed whether there is no node with a failed routing function on a communication route between the available nodes. If there is a node with a failed routing function on the communication route between at least one pair of nodes, the all-to-all communication is not guaranteeable. After confirming that the all-to-all communication is guaranteeable, the operation unit 12 determines which nodes to assign to a job, from among the available nodes in the BB 5.

By confirming in advance that the all-to-all communication between the available nodes in the BB 5 is guaranteeable, it becomes possible to guarantee communication between any nodes selected and assigned in the BB 5. This approach eliminates the need of determining whether communication is possible each time a node to be assigned is selected, which improves the processing efficiency in selecting nodes to be assigned.

If it is confirmed that the all-to-all communication between the available nodes in the BB 5 is not guaranteeable after the ranges are determined for all the axes, the operation unit 12 re-determines the ranges so as to change the ranges for at least some of the axes, thereby finding such a BB 5 that guarantees the all-to-all communication.

There may be a case where shifting the position of the temporary range of an axis of attention without changing the width thereof results in a failure in finding a position where the all-to-all communication between the available nodes in the BB 5 is guaranteeable. In this case, even if the width of the temporary range of the axis of attention is extended, the generated BB 5 may include a region where the all-to-all communication is not guaranteeable, which means that the all-to-all communication is not guaranteeable as a whole. In such a case, the operation unit 12 may cancel the determination of a range of coordinates for the axis of attention and re-determine the ranges so as to change the ranges for at least some of the defined axes, whose ranges have already been determined. This approach eliminates an extra search process and thus improves the processing efficiency.

An n-dimensional mesh or torus interconnection network may be structured hierarchically. For example, a first network is taken as a lower-level network, where nodes in a node group unit, which is a set of nodes, are connected by a u-dimensional mesh or torus interconnect (u is an integer of one or greater). A second network is taken as an upper-level network, where a plurality of node group units are connected by a v-dimensional mesh or torus interconnect (v is an integer of one or greater). In this second network, nodes having the same u-dimensional coordinates in adjacent node group units are connected to each other, for example.

In the case of the above hierarchical network topology, it is possible to efficiently determine whether communication between the node group units in the second network is guaranteeable. For example, the operation unit 12 confirms whether the u-dimensional coordinates of the individual nodes in the plurality of node group units include at least one coordinate that does not overlap with the u-dimensional coordinates of each failed node with a failed routing function in the plurality of node group units. If at least one coordinate does not overlap, nodes having the coordinate in all the node group units are able to perform routing. That is to say, if a plurality of node group units include nodes whose coordinates do not overlap with the u-dimensional coordinates of each node with a failed routing function, it is possible to perform communication between the node group units via these nodes. In the case where such coordinates that do not overlap are detected, the operation unit 12 determines that the all-to-all communication between the node group units in the second network is guaranteeable. In this way, it is possible to easily determine whether communication between node group units in the second network is guaranteeable.

If many nodes are requested and the width of the temporary range of an axis of attention is small, it may be obvious that the BB 5 does not include as many available nodes as the requested number of nodes. In this case, the operation unit 12 may take, for example, the entire range as a range of coordinates from the beginning. For example, the operation unit 12 subtracts the number of available nodes whose coordinates on each defined axis fall within its determined range and whose coordinates on the axis of attention are a prescribed coordinate, from the number of available nodes whose coordinates on each defined axis fall within the its determined range. If the subtraction result does not reach the requested number of nodes, the operation unit 12 takes the entire range of coordinates of the axis of attention as an initial value for the width of the temporary range. This approach eliminates the need of an extra search and thus improves the processing efficiency.

Note that the operation unit 12 and the storage unit 11 may be implemented by using a processor and a memory provided in the job management apparatus 10, respectively, for example.

Second Embodiment

The following describes a second embodiment.

Figure 2:
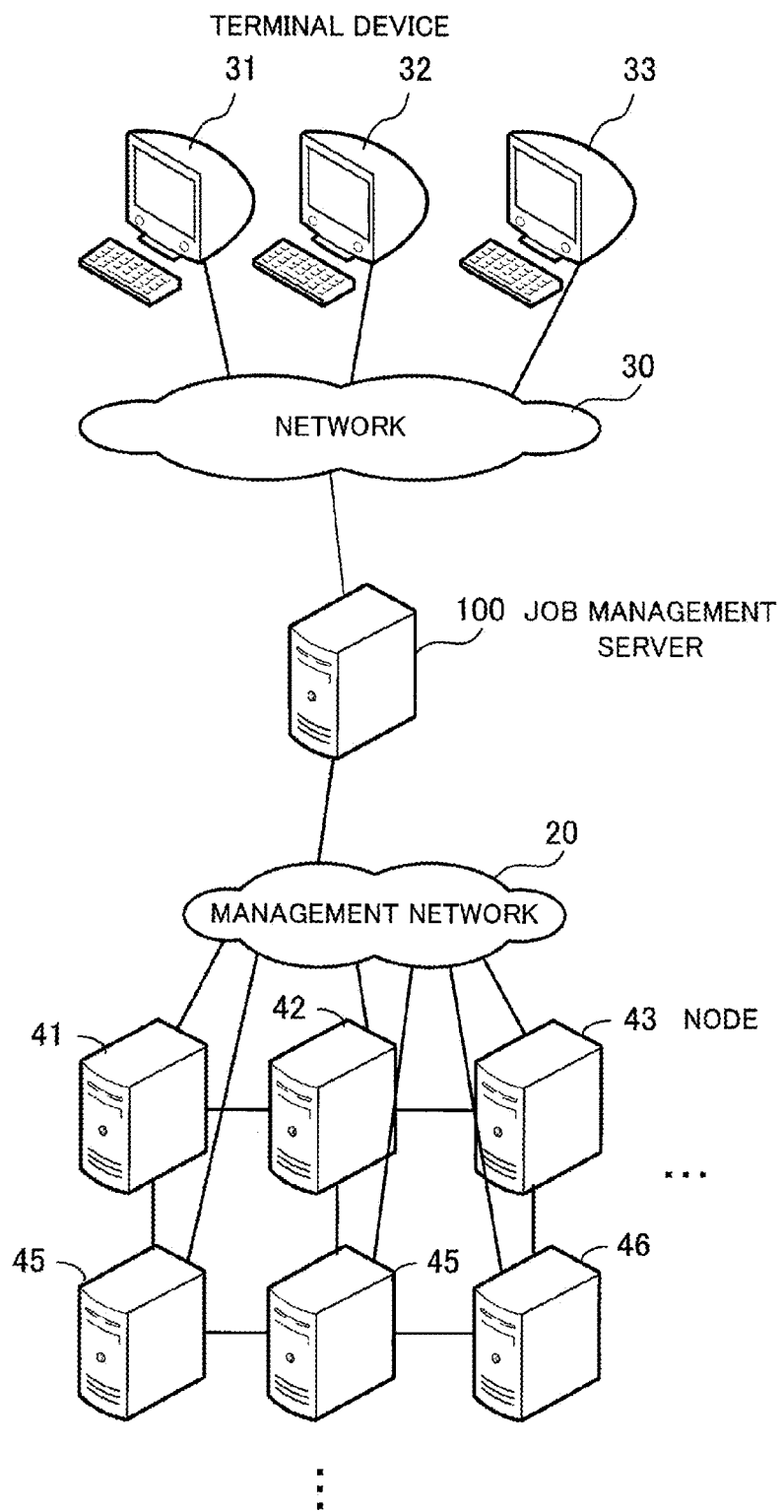
FIG. 2 illustrates an example of a system configuration according to a second embodiment.

FIG. 2 illustrates an example of a system configuration according to the second embodiment. In the second embodiment, a plurality of terminal devices 31, 32, 33, . . . are connected to a job management server 100 over a network 30. The terminal devices 31, 32, 33, . . . are computers that are used by users that issue commands to execute parallel jobs.

The job management server 100 manages assignment of nodes, that are resources for execution, to jobs specified by job execution requests received from the terminal devices 31, 32, 33, . . . . The job management server 100 is connected to a plurality of nodes 41 to 46 . . . over a management network 20. The plurality of nodes 41 to 46 . . . are computers that execute jobs and are connected by an n-dimensional mesh or torus interconnect (n is an integer of two or greater).

In such a system, when receiving a job execution request from any terminal device, the job management server 100 determines which nodes to assign to the requested job according to the parallelism of the job. For example, the job management server 100 assigns four nodes to the job with a parallelism of four. The job management server 100 then outputs a job execution instruction to the nodes assigned to the job, and the nodes having received the job execution instruction execute the job accordingly. In the case where a plurality of nodes perform a parallel job, these nodes perform data communication with each other for transmission and reception of computation results or the like.

Figure 3:
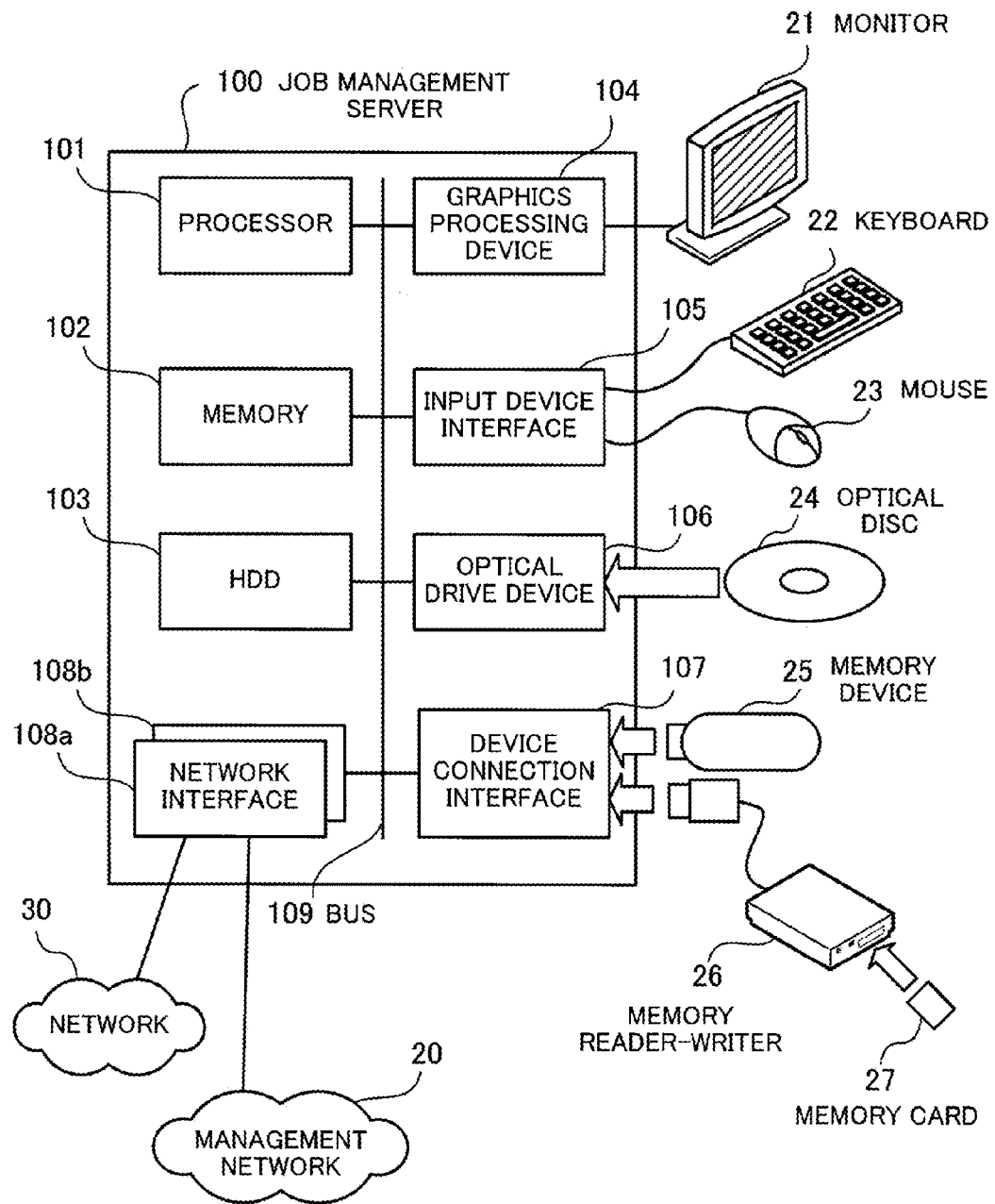
FIG. 3 illustrates an example of a hardware configuration of a job management server.

FIG. 3 illustrates an example of a hardware configuration of a job management server. The job management server 100 is entirely controlled by a processor 101. A memory 102 and a plurality of peripheral devices are connected to the processor 101 with a bus 109. The processor 101 may be a multi-processor. The processor 101 is, for example, a Central Processing Unit (CPU), a Micro Processing Unit (MPU), or a Digital Signal Processor (DSP). Some or all of the functions of the processor 101 may be implemented by using an Application Specific Integrated Circuit (ASIC), Programmable Logic Device (PLD), or other electronic circuits.

The memory 102 is used as a primary storage device of the job management server 100. The memory 102 temporarily stores at last part of Operating System (OS) programs and application programs to be executed by the processor 101. The memory 102 also stores various types of data to be used while the processor 101 operates. As the memory 102, for example, a volatile semiconductor memory device, such as a Random Access Memory (RAM), may be used.

The peripheral devices include a Hard Disk Drive (HDD) 103, a graphics processing device 104, an input device interface 105, an optical drive device 106, a device connection interface 107, and network interfaces 108a and 108b.

The HDD 103 magnetically writes and reads data on built-in disks. The HDD 103 is used as a secondary storage device of the job management server 100. The HDD 103 stores the OS programs, application programs, and various types of data. As the secondary storage device, a non-volatile semiconductor storage device, such as a flash memory, may be used.

To the graphics processing device 104, a monitor 21 is connected. The graphics processing device 104 displays images on the screen of the monitor 21 in accordance with instructions from the processor 101. As the monitor 21, a display device using Cathode Ray Tube (CRT), a liquid crystal display device, or the like may be used.

To the input device interface 105, a keyboard 22 and a mouse 23 are connected. The input device interface 105 gives the processor 101 signals received from the keyboard 22 and mouse 23. The mouse 23 is one example of pointing devices, and another pointing device may be used. Other pointing devices include, for example, a touch panel, a tablet, a touchpad, a track ball, and so on.

The optical drive device 106 reads data from an optical disc 24 using laser light or the like. The optical disc 24 is a portable recording medium on which data is recorded so as to be read with reflection of light. As the optical disc 24, a Digital Versatile Disc (DVD), DVD-RAM, Compact Disc Read Only Memory (CD-ROM), CD-R (Readable), CD-RW (ReWritable), etc. may be used.

The device connection interface 107 is a communication interface for allowing peripheral devices to be connected to the job management server 100. For example, a memory device 25 and a memory reader-writer 26 may be connected to the device connection interface 107. The memory device 25 is a recording medium that is provided with a function of performing communication with the device connection interface 107. The memory reader-writer 26 performs data read and write on a memory card 27, which is a card-type recording medium.

The network interface 108a is connected to the network 30. The network interface 108a communicates data with the terminal devices 31, 32, 33, . . . over the network 30.

The network interface 108b is connected to the management network 20. The network interface 108b communicates data with the nodes 41 to 46 . . . over the management network 20.

With the above hardware configuration, the processing functions of the second embodiment may be implemented. In this connection, the job management apparatus 10 of the first embodiment may be configured with the same hardware as the job management server 100 of FIG. 3. In addition, the plurality of nodes 41 to 46 . . . may be configured with the same hardware as the job management server 100. In this connection, the plurality of nodes 41 to 46 . . . each further include an additional interface for interconnection to other nodes.

The job management server 100 implements the processing functions of the second embodiment by executing programs stored in a computer-readable recording medium, for example. The program describing the contents of processing to be executed by the job management server 100 may be recorded on various types of recording media. For example, the programs to be executed by the job management server 100 may be stored on the HDD 103. The processor 101 loads at least part of the programs from the HDD 103 to the memory 102 and then executes the programs. Alternatively, the programs to be executed by the job management server 100 may be recorded on a portable recording medium, such as the optical disc 24, the memory device 25 or the memory card 27. By being installed on the HDD 103 under the control of the processor 101, for example, the programs recorded on the portable recording medium become executable. Alternatively, the processor 101 executes the programs while reading the programs directly from the portable recording medium.

In such a system, the job management server 100 assigns a plurality of nodes to a parallel job such that these nodes are able to communicate data with each other efficiently.

Figure 4:
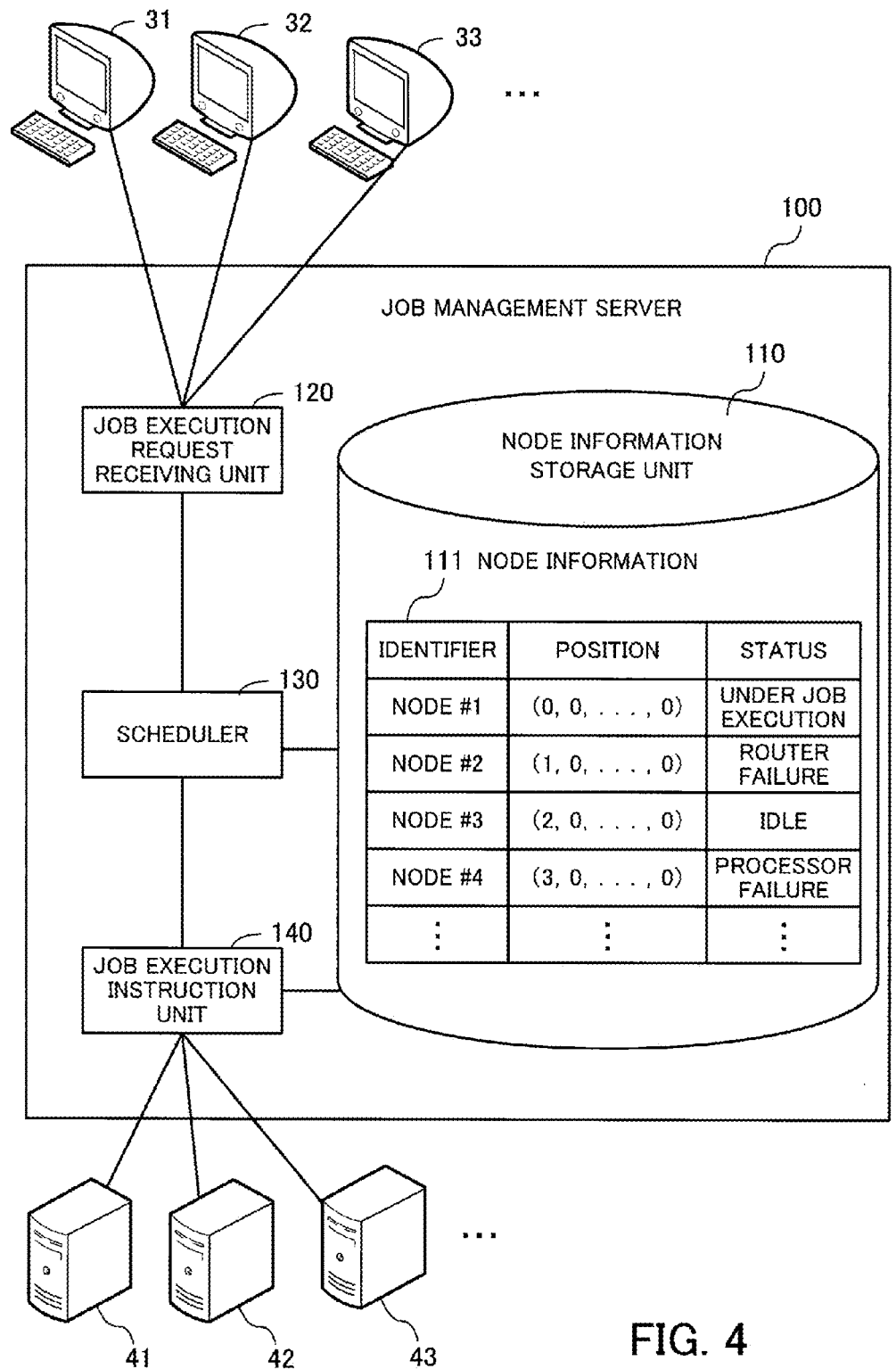
FIG. 4 is a block diagram illustrating the functions of the job management server.

FIG. 4 is a block diagram illustrating the functions of a job management server. The job management server 100 includes a node information storage unit 110, a job execution request receiving unit 120, a scheduler 130, and a job execution instruction unit 140.

The node information storage unit 110 stores information (node information 111) about nodes to be used for the computation of jobs. The node information 111 indicates the identifier, position, and status of each node, for example. The position is represented by coordinates on n-dimensional axes. The node status includes, for example, "under job execution," "router failure," "processor failure," "idle," and others. Nodes that do not have failed processors or are not under job execution and that are idle are taken as available nodes, which are newly assignable to jobs. In addition, inter-node communication may not be performed via a node with a failed router. Therefore, whether all-to-all communication between the nodes in a rectangular region is possible is determined based on whether the all-to-all communication is possible without going through any nodes having failed routers. The node information storage unit 110 may be implemented by using a partial storage space of the memory 102 or the HDD 103, for example.

The job execution request receiving unit 120 receives job execution requests from the terminal devices 31, 32, 33, . . . . The job execution request receiving unit 120 transfers a received job execution request to the scheduler 130 to request assignment of nodes to the job requested by the job execution request.

The scheduler 130 assigns nodes to the job requested by a job execution request, with reference to the node information 111. For example, the scheduler 130 selects the smallest rectangular region that includes as many available nodes as the requested number of nodes for the job, from the mesh or torus interconnection network, and assigns nodes existing in the rectangular region to the job. This approach shortens the communication distance between nodes that execute a parallel job and improves communication efficiency. A shorter communication distance between nodes reduces the possibility of a communication error due to a failure in a node existing on the communication route. Note that the scheduler 130 allows nodes already assigned to other jobs to exist in a rectangular region (BB). This makes it possible to achieve node assignment with efficient use of nodes in the system. After determining which nodes to assign to the job, the scheduler 130 notifies the job execution instruction unit 140 of the determined nodes.

The job execution instruction unit 140 instructs the nodes assigned to the job to execute the job. The job execution instruction unit 140 updates the node information about the nodes, which have been instructed to execute the job, to indicate "under job execution." Then, when each of the nodes completes the execution of the job, the job execution instruction unit 140 updates the node information about the node to indicate "idle." The job execution instruction unit 140 further monitors the operational status of each node 41, 42, 43, . . . to detect a trouble in the functions of a processor or router. When detecting such a trouble in a node, the job execution instruction unit 140 adds, as the status of the node, the details of the trouble to the node information about the node.

The lines connecting between elements illustrated in FIG. 4 represent part of communication paths, and communication paths other than the illustrated ones may be configured. In addition, the functions of each element illustrated in FIG. 4 may be implemented by, for example, a computer executing the program module corresponding to the element.

Such a job management server 100 performs node assignment with using node resources efficiently and with minimizing degradation of inter-node communication performance. For example, the scheduler 130 does not take a submesh or a subtorus as a BB but allows BBs for respective jobs to overlap with each other. This makes it possible to use nodes efficiently, unlike the case of determining a submesh or subtorus for each job and assigning nodes in the submesh or subtorus.

Figure 5:
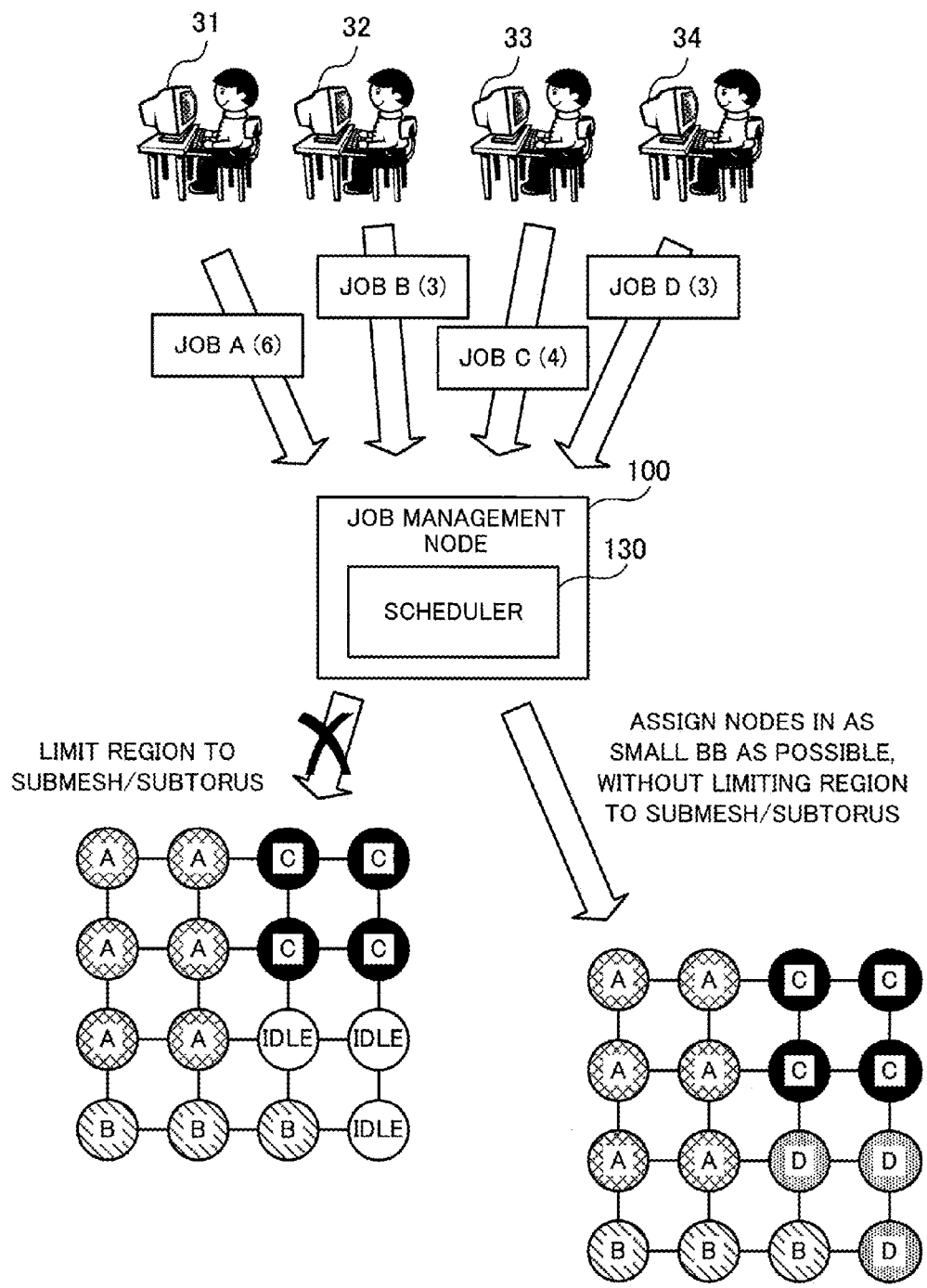
FIG. 5 illustrates an example of assignment using nodes efficiently.

FIG. 5 illustrates an example of assignment using nodes efficiently. In the example of FIG. 5, a plurality of terminal devices 31 to 34 issue job execution requests for four respective jobs. The terminal device 31 issues an execution request for "job A" that uses six nodes. The terminal device 32 issues an execution request for "job B" that uses three nodes. The terminal device 33 issues an execution request for "job C" that uses four nodes. The terminal device 34 issues an execution request for "job D" that uses three nodes. Assume now that nodes are assigned to the jobs in the order of "job A," "job B," "job C," and "job D."

In the case where nodes in a submesh or subtorus are assigned to a job, it is not possible to assign any nodes to the job D even though there are three idle nodes left after nodes are assigned to the job A, job B, and job C. Submeshes or subtori are not allowed to overlap with each other and therefore it is not possible to generate a submesh or subtorus that includes these three nodes.

By contrast, in assigning nodes in a mesh or torus network topology, the second embodiment does not limit a region for assignment to one job to a submesh or subtorus. That is to say, the scheduler 130 generates, for each job, the smallest BB that includes idle nodes more than or equal to the requested number of nodes for the job, and then assigns nodes in the BB to the job. The BB is allowed to overlap with another BB. Thus, it is possible to generate a BB that includes the three idle nodes, for which it is not possible to generate a submesh or subtorus, and then to assign these nodes in the BB to the job D.

In addition, the second embodiment generates as small a BB as possible to thereby minimize degradation of job performance due to interference in communication between jobs and an increase in the number of intervening routers. The following describes interference in communication between jobs.

Figure 6:
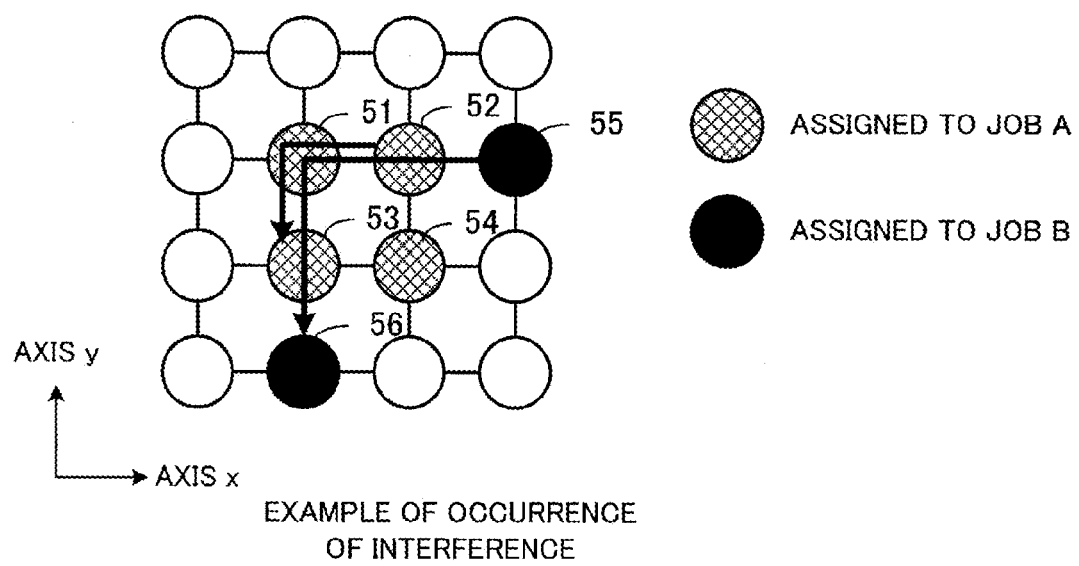
FIG. 6 illustrates an example of occurrence of interference in communication.

FIG. 6 illustrates an example of occurrence of interference in communication. For example, consider the case where four nodes 51 to 54 are assigned to one job (job A), and nodes 55 and 56 are assigned to another job (job B). In addition, assume that data transfer between nodes is done by transfer first in the x direction and then in the y direction. In the case of the data transfer from the node 52 to the node 53, the data is transferred from the node 52 to the node 51 then to the node 53. In the case of the data transfer from the node 55 to the node 56, the data is transferred from the node 55 to the node 52, then to the node 51, then to the node 53, and then to the node 56. These two transfer routes for the data transfers partially overlap: a part from the node 52 to the node 51 and a part from the node 51 to the node 53. If simultaneous data transfers are performed through these routes, which overlap with each other, interference is caused in the communication and either of the data transfers is postponed to a later time point. As a result, it takes more time than expected to execute one of the jobs.

Such interference in communication is more likely to occur in longer communication between nodes. However, the second embodiment generates as small a BB as possible in assigning nodes to a job, which reduces the possibility of assigning distant nodes to the job. That is, the second embodiment assigns nodes as close to each other as possible to the job. By doing so, it is possible to reduce interference in communication.

In addition, because of the generation of the smallest BB, it is expected to reduce the number of jobs that suffer from the impact of a failure in the routing function of a node.

Figure 7:
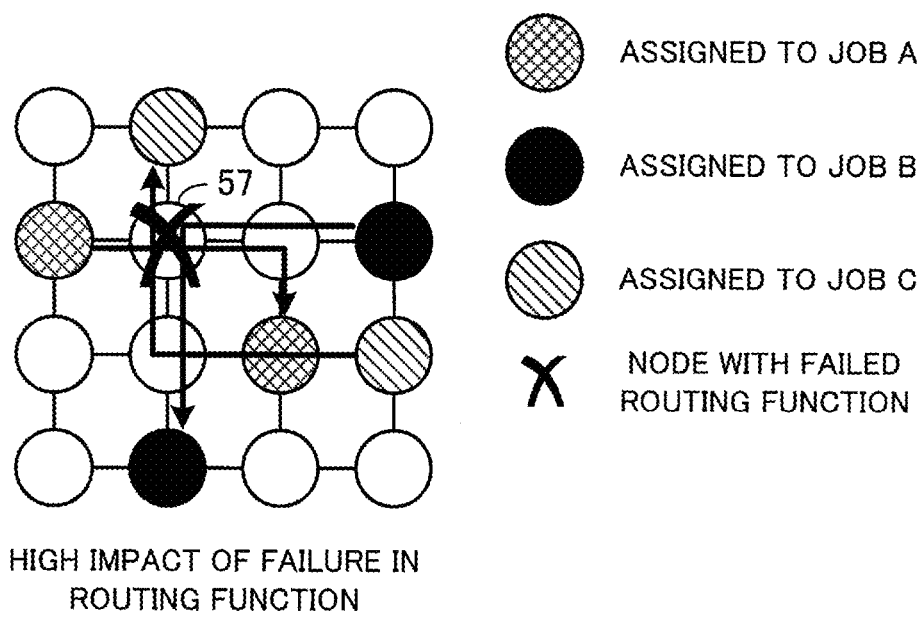
FIG. 7 illustrates an example of the area of impact of a router failure.

FIG. 7 illustrates an example of the area of impact of a router failure. Assume that a network topology is a mesh or torus and the routing for packets in inter-node communication is performed statically. This means that data communication is performed through a predetermined route. Referring to the example of FIG. 7, all of the communication between nodes assigned to the job A, the communication between nodes assigned to the job B, and the communication between nodes assigned to the job C go through the node 57. If the routing function of the node 57 fails, this failure has an impact on all of the jobs for which inter-node communication goes through the node 57. That is, the more communication routes overlap, the larger the impact of a failure in a single node is likely to be.

The second embodiment generates as small a BB as possible, and this makes it possible to minimize the number of jobs that suffer from the impact of a failure in a router or link used by jobs already assigned.

Consider the case where the packet routing is performed statically and there is a node with a failed routing function before node assignment to a job. In this case, if a generated BB includes the node and nodes in the BB are assigned to the job, the inter-node communication may not be guaranteed.

Figure 8:
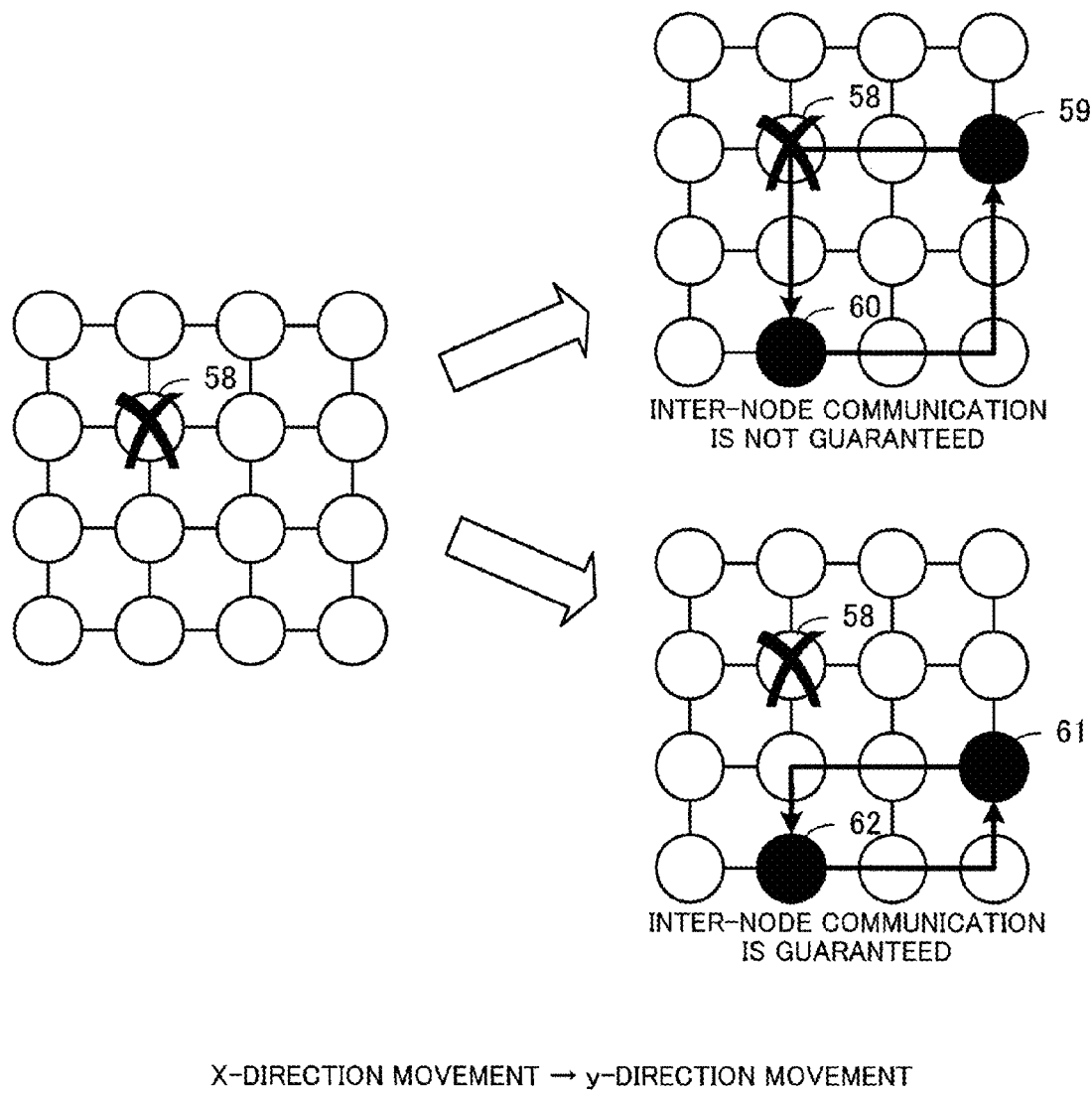
FIG. 8 illustrates examples of inter-node communication in the case where there is a node with a failed router.

FIG. 8 illustrates examples of inter-node communication in the case where there is a node with a failed router. In the examples of FIG. 8, it is detected in advance that a failure has occurred in the routing function of a node 58. If nodes 59 and 60 are assigned to the same job, the communication between these nodes 59 and 60 is not guaranteeable. However, in the case where nodes 61 and 62 are assigned to the same job, their inter-node communication is guaranteeable.

The second embodiment selects a BB that guarantees communication between all nodes that are assignable to a single job, and assigns nodes in the BB to the job. This approach reduces a risk of reassignment due to detection of a communication error after node assignment.

As described above, while using nodes efficiently, the second embodiment reduces the occurrence of interference, the area of impact of a failure in a routing function, and the possibility of assignment that does not guarantee inter-node communication.

Figure 9:
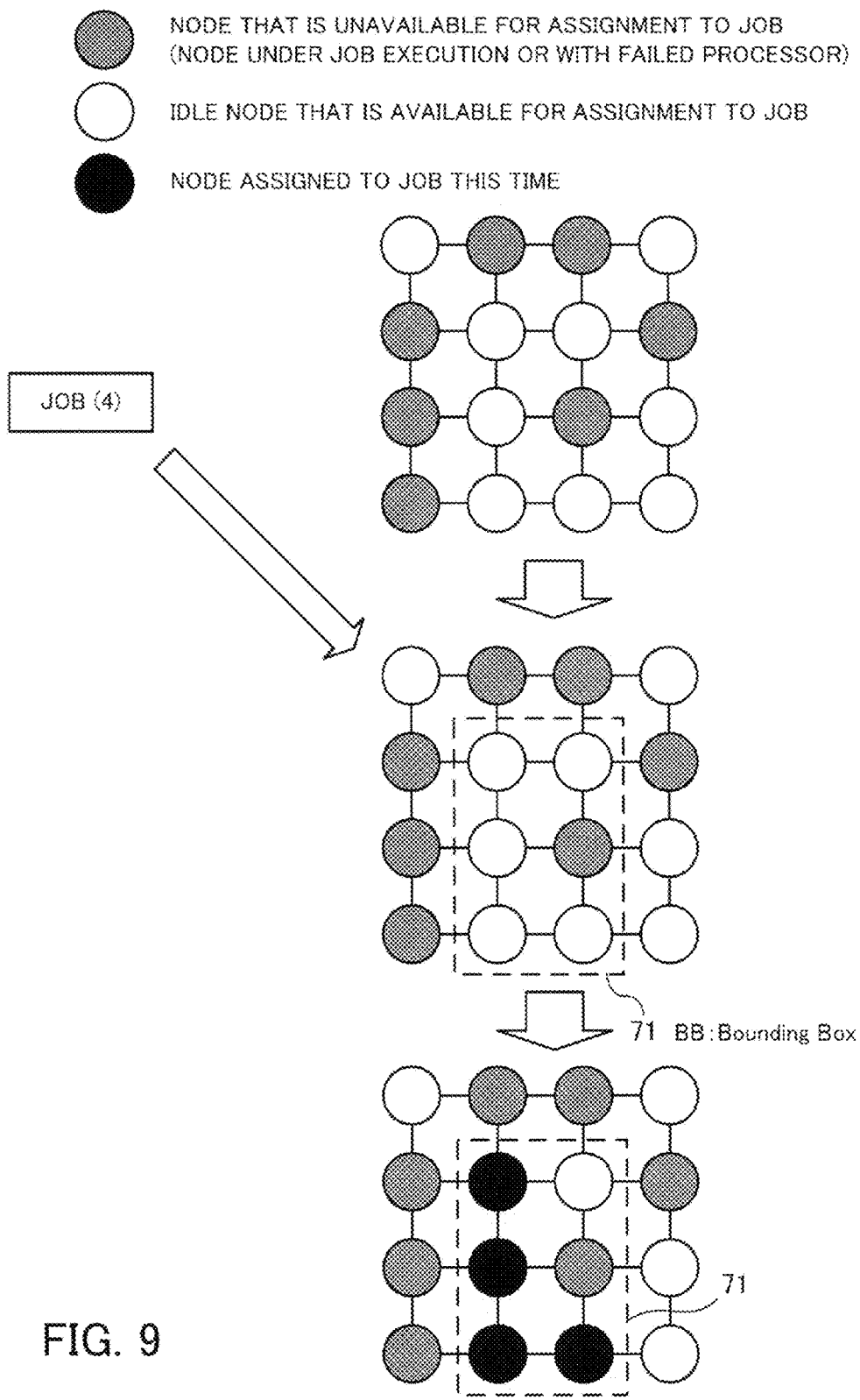
FIG. 9 illustrates an example of node assignment according to the second embodiment.

FIG. 9 illustrates an example of node assignment according to the second embodiment. FIG. 9 illustrates an example where an execution request is made for a job that needs parallel processing with four nodes. In this case, the scheduler 130 determines a BB 71 that includes available nodes more than or equal to the requested number of nodes for the job. Referring to the example of FIG. 9, the BB 71 includes five available nodes. The scheduler 130 assigns available nodes in the BB 71 to the job.

With respect to the BB search, the scheduler 130 searches BBs in ascending order of size, and assigns nodes in a first-found BB. By doing so, it is possible to assign nodes from as small a BB as possible.

For example, assume that a network topology is an n-dimensional mesh or torus. The scheduler 130 determines a priority order of the n axes. The scheduler 130 then searches for an appropriate BB in order of size and priority, from a small size in an axial direction with high priority, and assigns nodes in a first-found BB to a job.

For example, consider the case where n=3 and the axes 0, 1, and 2 have the highest, second-highest, and lowest priority, respectively. In this case, BBs are searched in the following order.

The ascending order of size in the axis-0 direction.

The ascending order of size in the axis-1 direction in the case of the same size in the axis-0 direction.

The ascending order of size in the axis-2 direction in the case of the same size in the axis-0 and -1 directions.

With regard to the priority order of axes, a higher priority may be given to an axis in which direction more pairs of nodes perform communication, on the basis of a network topology. For example, a certain node is selected and a set of pairs of nodes (packet transmission node and packet reception node) that perform communication via the certain node is considered. Then, the pairs of nodes are classified according to in which axial direction the communication between the paired nodes is routed to pass through the selected node. Then, a higher priority is given to an axis with more pairs.

In addition, it may be determined that communication is performed in order of the x direction, y direction, and z direction. In this case, the highest priority may be given to the axis y if it is known from past analysis information that communication in the y direction is performed more than that in the other directions.

As described above, when a failure occurs in a node, BBs are selected such that the number of jobs whose communication is performed via the node is as few as possible. As a result, it is possible to reduce the number of jobs that suffer from the failure as much as possible within an appropriate processing time.

The following describes in detail how to assign nodes to a job through an efficient search process. In the following description, the network topology is an n-dimensional mesh or torus, and the priority is given to the n axes in advance, unless otherwise noted. In this example, assume that the axis 0 is given the highest priority, then the axes 1, 2, are given priority in descending order, and then the axis (n−1) is given the lowest priority. In this connection, the following technique is applicable to a system with a priority order of axes if the axes are given names in order of priority as described above.

Assume that the position of each node belonging to the system is represented by n-dimensional coordinates ($x_0$, $x_1$, ..., $x_{n-1}$). $x_i$ is an integer of zero or greater indicating a coordinate of the node in the axis-i direction. The origin is defined as $O=(0, 0, ..., 0)$, and the size of axis i is defined as $S_i = \max\{x_i+1 | x \in X\}$, $S=(S_0, S_1, ..., S_{(n-1)})$. X represents a set of nodes belonging to the system. An n-dimensional rectangular region whose origin is x and whose size in the axis-i direction is $s_i$ is represented by R(x, s) where $s=(s_0, s_1, ..., s_{(n-1)})$ $R(x, s)=\{(x_0+d_0, x_1+d_1, ..., x_{(n-1)}+d_{(n-1)}) | d_0 \in [0, s_0), d_1 \in [0, s_1), ..., d_{(n-1)} \in [0, s_{(n-1)})\}$. In the following, assume that R(O, S)=X is satisfied, that is, there is a node at every coordinate location in the rectangular region R(O, S). Even in the case of systems that do not satisfy this condition, the technique is applicable, considering that a node that is not available for assignment to a job or for communication route exists at coordinates where a node does not exist.

Note that a certain BB is represented as R(x, s), where x denotes the origin and s denotes a size. The number of available nodes in a BB is represented as N(x, s). In this example, assume that nodes are assigned to a single job. The requested number of nodes for the job is taken as p, which is an integer of one or greater. In order to assign resources to a plurality of jobs, the processing is repeated.

Figure 10:
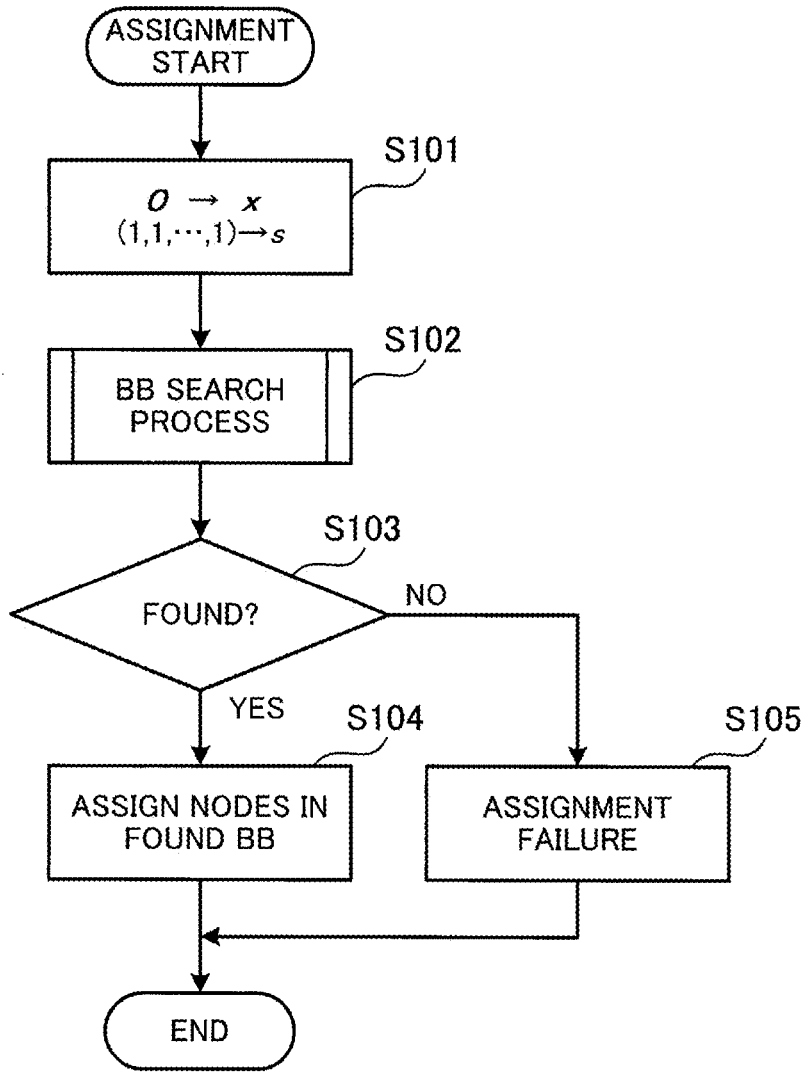
FIG. 10 is a flowchart illustrating how to perform a node assignment process according to the second embodiment.

FIG. 10 is a flowchart illustrating how to perform a node assignment process according to the second embodiment. This process is initiated in response to a job execution request specifying the requested number of nodes.

(Step S101) The scheduler 130 sets the initial value of x, which indicates the starting position of a BB, to the origin O. The scheduler 130 also sets the initial values for the size s of the BB to the smallest values (1, 1, ..., 1).

(Step S102) The scheduler 130 performs a BB search process to find a BB that includes as many available nodes as the requested number of nodes for the job. This process will be described in detail later (see FIG. 11).

(Step S103) The scheduler 130 determines whether a BB including as many available nodes as the requested number of nodes for the job has been found through the BB search process. If such a BB is found, the process proceeds to step S104. If such a BB is not found, the process proceeds to step S105.

(Step S104) The scheduler 130 selects as many nodes as the requested number of nodes for the job from the idle nodes in the found BB, and assigns the selected nodes to the job. Then, the assignment process is completed.

(Step S105) The scheduler 130 terminates the assignment process as an assignment failure. In the case of the assignment failure, the scheduler 130 waits for another job currently executed to be completed, and then executes the assignment process again after the other job is completed, for example.

The following describes how to perform the BB search process in detail.

Figure 11:
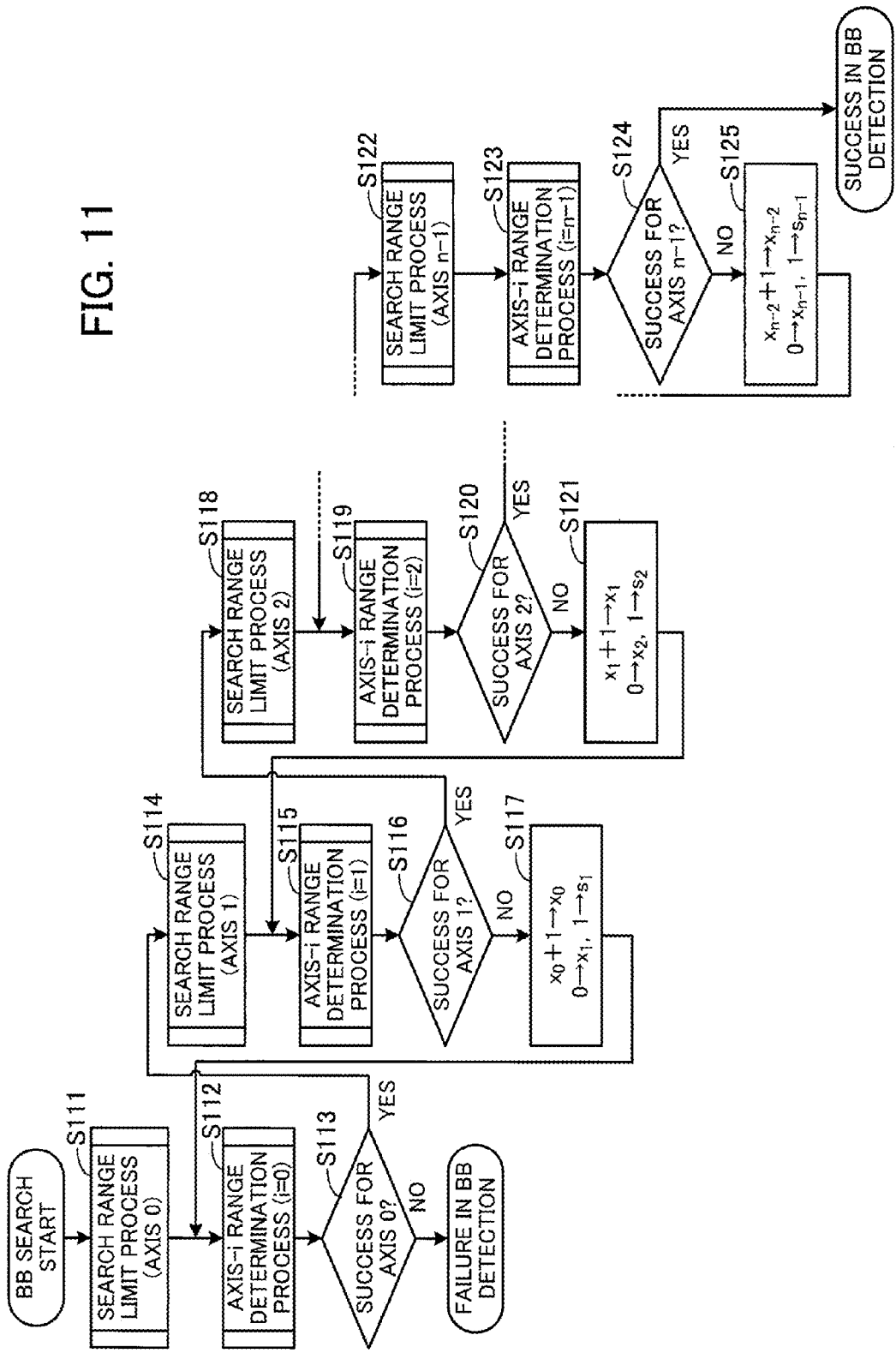
FIG. 11 is a flowchart illustrating how to perform a BB search process.

FIG. 11 is a flowchart illustrating how to perform a BB search process.

(Step S111) The scheduler 130 performs a search range limit process with respect to the axis 0. In the case where it is needed to maximize the size of a BB in the direction of the axis of attention in order to include as many idle nodes as the requested number of nodes for a job, this search range limit process is performed to set the width of the BB in the direction of the axis of attention to the maximum. This eliminates the need of the search process with respect to a BB with a smaller width in the direction of the axis of attention, thereby streamlining the processing. This search range limit process will be described in detail later (see FIG. 13).

(Step S112) The scheduler 130 performs an axis-i range determination process with respect to i=0. Thereby, a range in the axis-0 direction of the BB is determined (starting position and size). This axis-i range determination process will be described in detail later (see FIG. 12).

(Step S113) The scheduler 130 determines whether a range has been determined successfully through the axis-i range determination process with respect to the axis 0. If a range has been determined, the process proceeds to step S114. If the range determination has failed, the scheduler 130 determines that it is not possible to find an appropriate BB and then terminates the BB search process.

In steps S114 to S116, the same process as steps S111 to S113 is performed with respect to the axis 1. If a range is determined successfully with respect to the axis 1 (Yes in step S116), the process proceeds to step S118. If the range determination has failed with respect to the axis 1 (No in step S116), the process proceeds to step S117.

(Step S117) Now that the range determination has failed with respect to the axis 1, the scheduler 130 increments the $x_0$ value by one. The scheduler 130 also initializes $x_1$ to zero and $s_1$ to one. Then, the process proceeds back to step S112 to perform the range determination with respect to the axis 0 again with the starting position of the range of the axis 0 changed.

In steps S118 to S121, the same process as steps S114 to S117 is performed with respect to the axis 2. If a range is determined successfully with respect to the axis 2 (Yes in step S120), the process with respect to the next axis 3 starts. If the range determination has failed with respect to the axis 2 (No in step S120), the $x_1$ value is incremented, and $x_2$ and $s_2$ are initialized (step S121), and then the process proceeds back to step S115.

Then, when ranges of the BB are determined for up to the axis n−2, the process proceeds to step S122. In the steps S122 to S125, the same process as steps S114 to S117 is performed with respect to the axis n−1. When a range is determined successfully with respect to the axis n−1 (Yes in step S124), the scheduler 130 completes the BB search process as a success, taking the BB having the determined ranges of the respective axes as a search result. If the range determination has failed with respect to the axis n−1 (No in step S124), the $x_{n-2}$ value is incremented, and $x_{n-1}$ and $s_{n-1}$ are initialized (step S125) and then the process with respect to the axis n−2 starts.

The following describes how to perform the axis-i range determination process.

Figure 12:
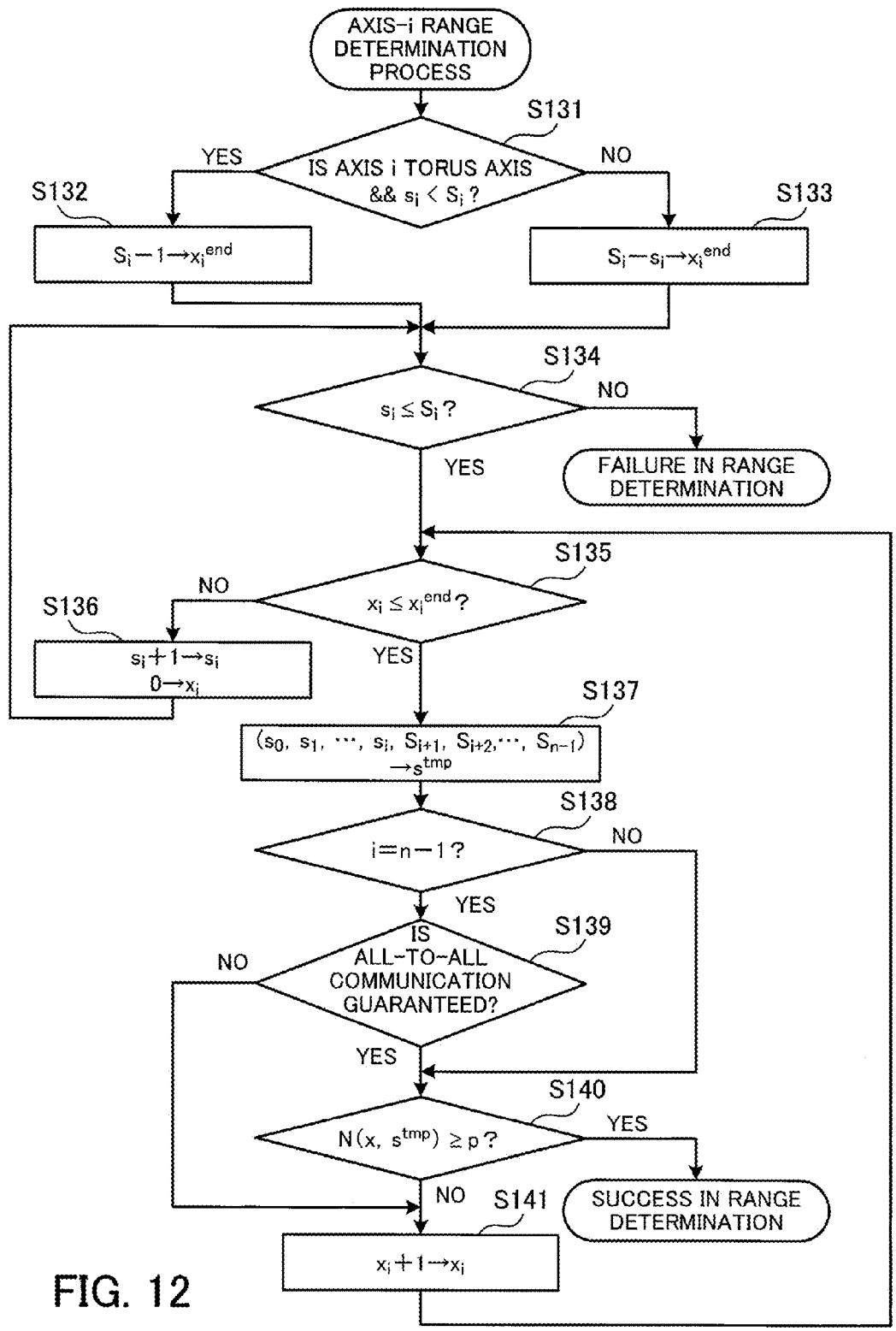
FIG. 12 is a flowchart illustrating an example of how to perform an axis-i range determination process.

FIG. 12 is a flowchart illustrating an example of how to perform an axis-i range determination process.

(Step S131) The scheduler 130 determines whether the conditions where the axis i is a torus axis and $s_i < S_i$ are satisfied. If these conditions are satisfied, the process proceeds to step S132. If the conditions are not satisfied, the process proceeds step S133.

(Step S132) The scheduler 130 sets $x_i^{end}$ to $S_i-1$. $x_i^{end}$ represents the end position to which the starting position $x_i$ of the BB may be shifted. Then, the process proceeds to step S134.

(Step S133) The scheduler 130 sets $x_i^{end}$ to $S_i-s_i$.

(Step S134) The scheduler 130 determines whether the condition where $s_i$ is lower than or equal to $S_i$ is satisfied. If this condition is satisfied, the process proceeds to step S135. If the condition is not satisfied, the axis-i range determination process is terminated as a range determination failure with respect to the axis i.

(Step S135) The scheduler 130 determines whether the condition where $x_i$ is lower than or equal to $X_i^{end}$ is satisfied. If this condition is satisfied, the process proceeds to step S137. If the condition is not satisfied, then the process proceeds to step S136.

(Step S136) Since there is no such a BB that satisfies the prescribed conditions even $x_i$ having the current width of $s_i$ is shifted to reach $X_i^{end}$, the scheduler 130 increments the $s_i$ value by one to increase the width of the BB in the axis-i direction. In addition, the scheduler 130 initializes the $x_i$ value to zero. Then, the process proceeds back to step S134.

(Step S137) The scheduler 130 sets $s^{tmp}$ to $(s_0, s_1, \ldots, s_i, S_{i+1}, S_{i+2}, \ldots, S_{n-1})$. This means that, as the size $s^{tmp}$ of the BB under search, the width selected through this process is set for each axial direction of up to the axis i, and the maximum width is set for each axial direction of the axis i+1 and subsequent axes.

(Step S138) The scheduler 130 determines whether the condition where i=n−1 is satisfied. If this condition is satisfied, the process proceeds to step S139 because the range determination process is currently performed with respect to the last axis. If the condition is not satisfied, the process proceeds to step S140.

(Step S139) The scheduler 130 confirms whether all-to-all communication between all nodes in the BB under search is guaranteed. It is confirmed that the all-to-all communication is guaranteed when there is no node with a failed routing function on the communication routes between all paired nodes in the BB. If the all-to-all communication is guaranteed, the process proceeds to step S140. If the all-to-all communication is not guaranteed, then the process proceeds to step S141.

(Step S140) The scheduler 130 determines whether the condition where $N(x, s^{tmp}) \geq p$ is satisfied. That is to say, it is determined whether the number of available nodes in the BB under search is greater than or equal to the requested number of nodes p for the job. Whether each node in the BB is available is determined with reference to the node information 111 stored in the node information storage unit 110.

In this connection, the computation process of N(x, s) may be streamlined by effectively using previous computation results. For example, in the search process with respect to the axis i, the search is sequentially performed one by one in order from $s_i=1$. Therefore, the scheduler 130 records the value of N(x, s) obtained in the search process with respect to $x_i$ and $s_i$, in a two-dimensional data structure or the like. By doing so, it becomes possible to perform the computation of N(x, s) in the case of $s_i>2$, through a single addition operation in the following manner.

$$N_i(x_i,s_i)=N_i(x_i,s_i-1)+N_i(x_i+s_i-1,1)$$

where $N_i(x_i, s_i)=N((x_0,\ldots,x_i,0,0,\ldots,0),(s_0,s_1,\ldots,s_i,S_{i+1},S_{i+2},\ldots,S_{n-1}))$.

In the case where the condition of $N(x, s^{tmp}) \geq p$ is satisfied, the axis-i range determination process is completed as a range determination success with respect to the axis i. If this condition is not satisfied, the process proceeds to step S141.

(Step S141) The scheduler 130 increments the $x_i$ value by one, and then the process proceeds back to step S135.

With the above process, the smallest BB including available nodes more than or equal to the requested number of nodes p for a job is found.

The following describes the search range limit process (steps S111, S114, S118, and S122 of FIG. 11) in detail. For example, the scheduler 130 subtracts the number of available nodes whose coordinates on each defined axis, whose range has been determined, fall within its determined range and whose coordinates on the axis i are a prescribed coordinate ($x_i$), from the number of available nodes whose coordinates on each defined axis fall within its determined range. If the subtraction result does not reach the requested number of nodes p, the scheduler 130 takes the entire range as the range of the axis i. The following describes the details.

The scheduler 130 executes $S_i \rightarrow s_i$ in the case where the following condition X is satisfied in the search process with respect to the axis i, and starts the search starting with the maximum size. This reduces the number of iterations of the search process with respect to the axis i, and therefore achieves high-speed processing.

The condition X is as follows:

$$\forall x_i \in [0, s_i), N(a_i(0), b_i(S_i)) N(a_i(x_i), b_i(1)) < p$$

where
$a_i(k)=x_0, x_1, \ldots, x_{i-1}, k, 0, 0, \ldots, 0$
$b_i(k)=(s_0, s_1, \ldots, s_{i-1}, k, S_{i+1}, S_{i+2}, \ldots, S_{i-1})$ In the case where the above condition is satisfied, only $s_i=S_i$ satisfies N(x, s) p, and therefore the search with respect to $s_i < S_i$ may be omitted.

Figure 13:
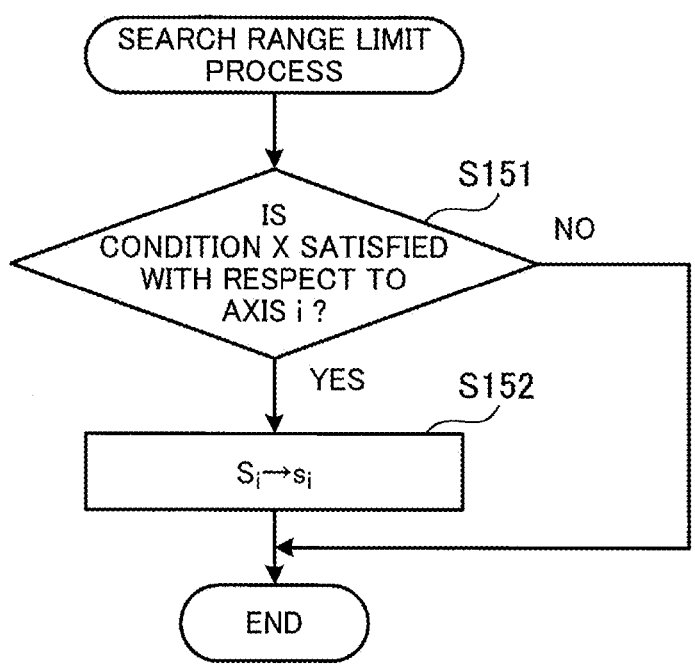
FIG. 13 illustrates an example of how to perform a search range limit process.

FIG. 13 illustrates an example of how to perform a search range limit process.

(Step S151) The scheduler 130 determines whether the condition X is satisfied with respect to the axis i. If the condition X is satisfied, the process proceeds to step S152. If the condition X is not satisfied, the search range limit process is completed.

(Step S152) The scheduler 130 sets $s_i$ to $S_i$. Then, the search range limit process is completed.

As described above, if only a BB having the maximum width in a certain axial direction is able to include available nodes more than or equal to the requested number of nodes for a job, the width in the axial direction is set to the maximum from the beginning and then a BB search is performed. This streamlines the search process.

Third Embodiment

The following describes a third embodiment. The third embodiment is designed not to confirm whether communication between all nodes is possible, with respect to BBs in which it is obvious from previous search results that communication between all nodes is not guaranteed, in BB search. This streamlines the BB search process.

For example, when a network topology is an n-dimensional mesh or torus interconnect, a scheduler 130 confirms, with respect to a BB generated through a BB search process, whether mutual communication (all-to-all communication) between all nodes in the BB is guaranteeable. If it is not guaranteeable, the scheduler 130 searches a next BB. At this time, if it is obvious from previous search results that communication between all nodes in the BB is not guaranteeable, the scheduler 130 does not confirm for the BB whether the communication between all the nodes is possible.

For example, consider the case where it is determined that all-to-all communication in every $x_i$ is not guaranteeable even if $x_i$ is changed with $s_i$ fixed. In this case, the region of any BB confirmed with the current $s_i$ is included even if $s_i$ is changed to a greater value. That is to say, a region where all-to-all communication is not guaranteeable is included, which means, in turn, that all-to-all communication is not guaranteeable as a whole. In this case, the scheduler 130 terminates the range determination process as a range determination failure with respect to the current axis i, for example, and performs again the range determination so as to change the ranges for at least some of the axes whose ranges have already been determined.

Figure 14:
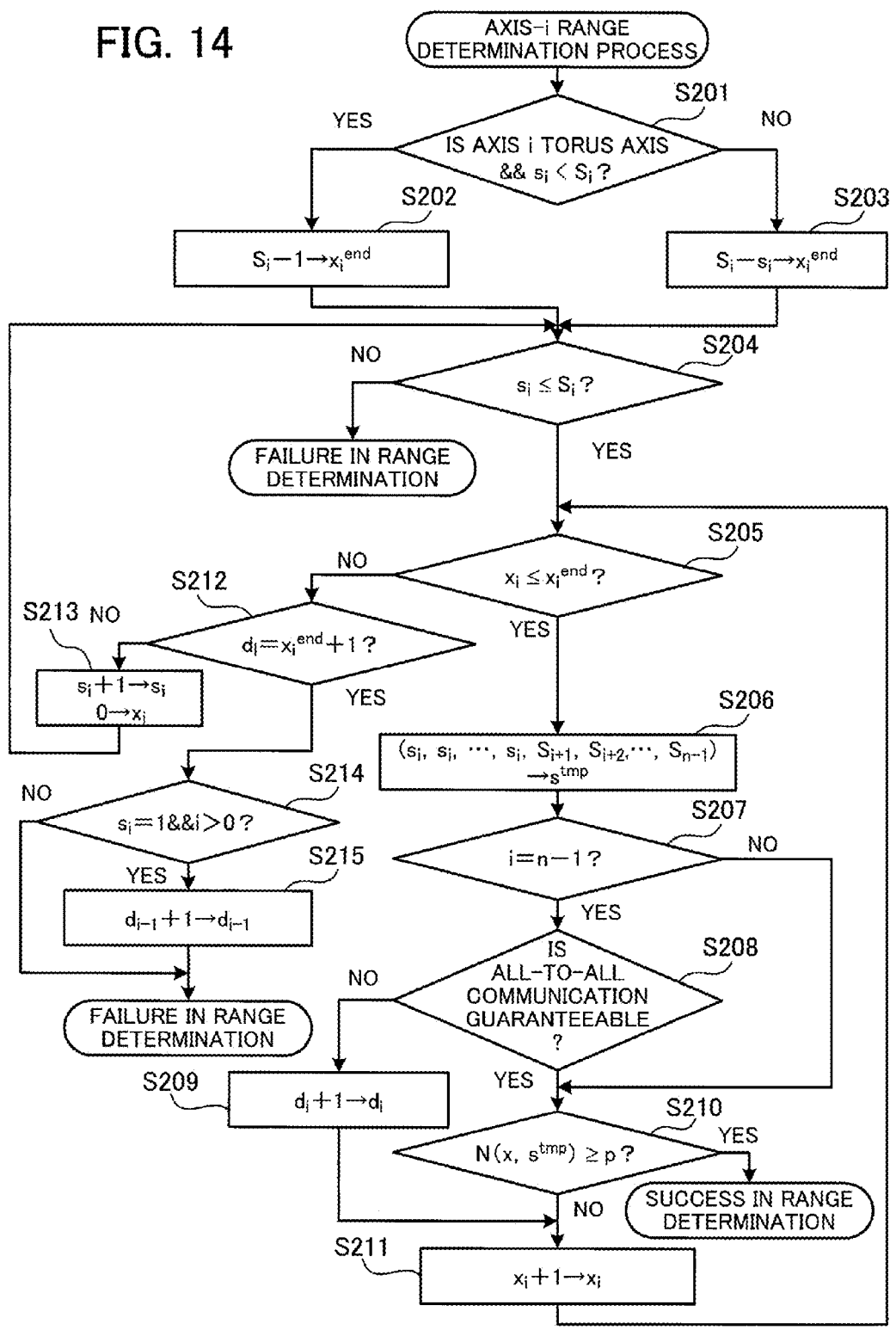
FIG. 14 is a flowchart illustrating an example of how to perform an axis-i range determination process according to a third embodiment.

FIG. 14 is a flowchart illustrating an example of how to perform an axis-i range determination process according to the third embodiment. In this connection, steps S201 to S208, S210, S211, and S213 of FIG. 14 are the same as steps S131 to S135, S137 to S141, and S136 of FIG. 12. The following describes different steps from FIG. 12.

(Step S209) Since all-to-all communication between all nodes in a BB under search is not guaranteeable, the scheduler 130 increments the $d_i$ value by one. $d_i$ represents the number of $x_i$ values for which all-to-all communication is not guaranteeable with respect to $s_i$ of the axis i. In the case where the $d_i$ value has reached the number of values that are settable as $x_i$, the all-to-all communication is not guaranteeable in all BBs whose size of the axis i is $s_i$. After the increment, the process proceeds to step S211.

(Step S212) When a range is not determined even by shifting the starting position $x_i$ of the BB to up to $X_i^{end}$ (No in step S205), it is determined whether $d_i=x_i^{end}+1$ is satisfied. If this formula is not satisfied, the process proceeds to step S213 to search a BB with the width in the axis-i direction increased. If $d_i=x_i^{end}+1$ is satisfied, it means that all-to-all communication is not guaranteeable in all BBs whose size of the axis i is $s_i$. In this case, the all-to-all communication does not get guaranteed even if the width of the BB is increased in the axis-i direction, and the process proceeds to step S214.

(Step S214) The scheduler 130 determines whether the conditions of $s_i=1$ and $i>0$ are satisfied. If these conditions are satisfied, the process proceeds to step S215. If the conditions are not satisfied, the scheduler 130 terminates the axis-i range determination process as a range determination failure.

(Step S215) The scheduler 130 increments the $d_{i-1}$ value by one, and terminates the axis-i range determination process as a range determination failure.

As described above, in the case where all-to-all communication is not guaranteeable with respect to a BB with a width of $s_i$ in the axis-i direction even if $x_i$ is changed to any value, the all-to-all communication is not guaranteeable even if the width of the BB is changed to $s_i+1$, $s_i+2$. Therefore, a further search is determined to be meaningless, and thus the search with respect to the axis i is terminated.

As described above, when a failure occurs in a node, this approach makes it possible to minimize the number of times the confirmation process is performed for guaranteeing communication between nodes assigned to one job. As a result, it is possible to guarantee all-to-all communication between all nodes assigned to one job, within an appropriate processing time.

Fourth Embodiment

The following describes a fourth embodiment. The fourth embodiment describes an example where a network topology is an n (=u+v)-dimensional mesh or torus interconnect (each of u and v is an integer of one or greater).

Figure 15:
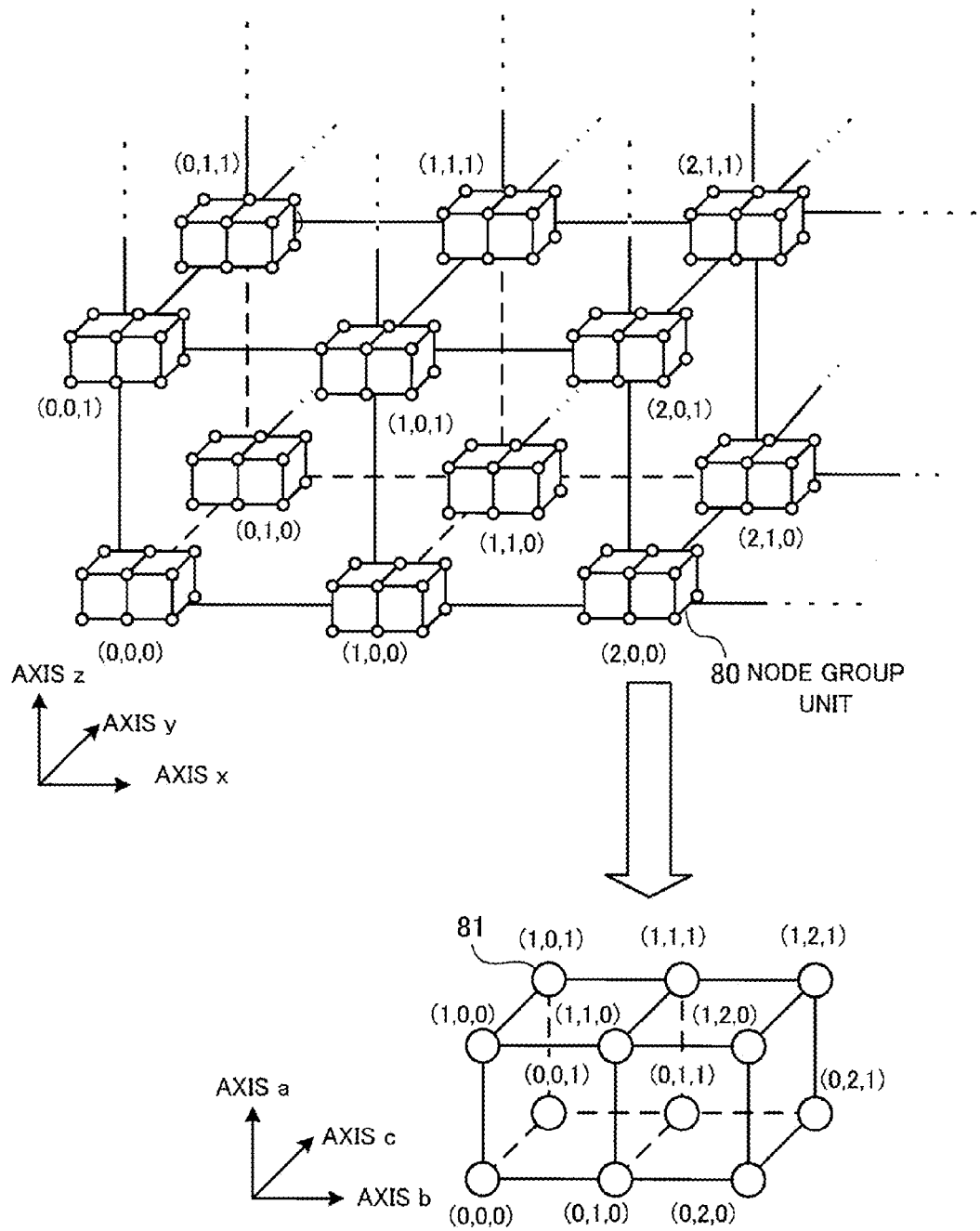
FIG. 15 illustrates an example of node interconnection according to a fourth embodiment.

FIG. 15 illustrates an example of node interconnection according to the fourth embodiment. In the fourth embodiment, node group units 80 are arranged in the axial directions in a v-dimensional (for example, three-dimensional) space. In each node group unit 80, nodes 81 are arranged in the axial directions in a u-dimensional (for example, three-dimensional) space.

Assume now that the u-dimensional space has axes a, b, and c and the v-dimensional space has axes x, y, and z. In this case, a six-dimensional (three dimensions plus three dimensions) mesh or torus interconnect is formed. The position of each node is represented by the coordinates on the axes a, b, and c and the coordinates on the axes x, y, and z.

Figure 16:
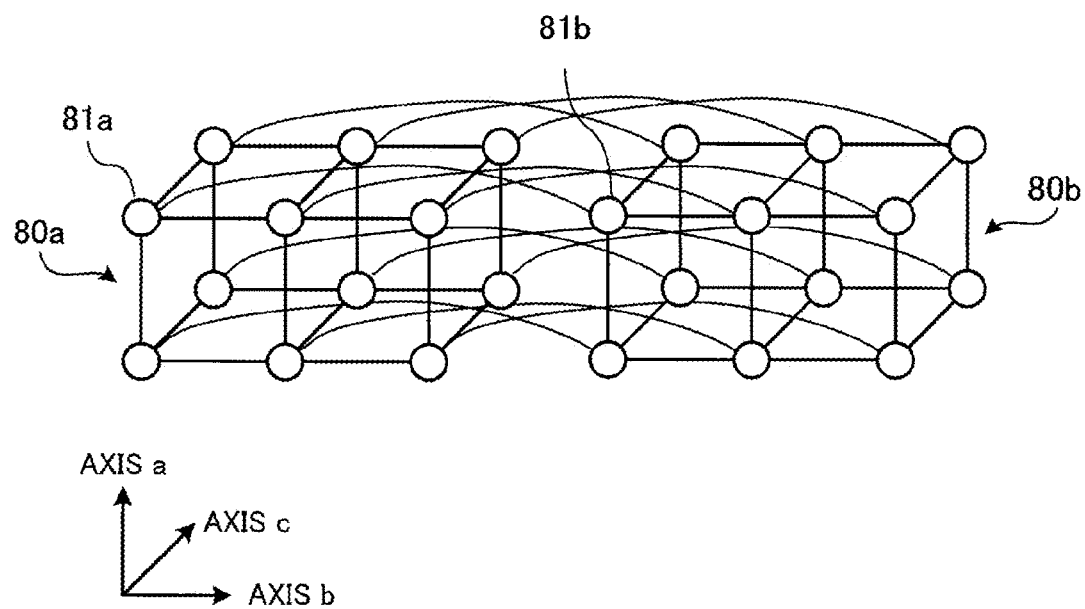
FIG. 16 illustrates an example of inter-node connections between adjacent node group units.

FIG. 16 illustrates an example of inter-node connections between adjacent node group units. Nodes 81a and 81b that have the same coordinates in the a-b-c space are connected to each other between the node group units 80a and 80b that are adjacent to each other in the x-y-z space. Referring to the example of FIG. 16, each node group unit includes 12 nodes, and therefore there are 12 interconnect links between the adjacent node group units 80a and 80b.

In the environment where nodes are connected to each other in such a network topology, data moves in axial directions in the order of axes b, c, a, x, y, z a, c, and b in the inter-node communication, for example.

Figure 17:
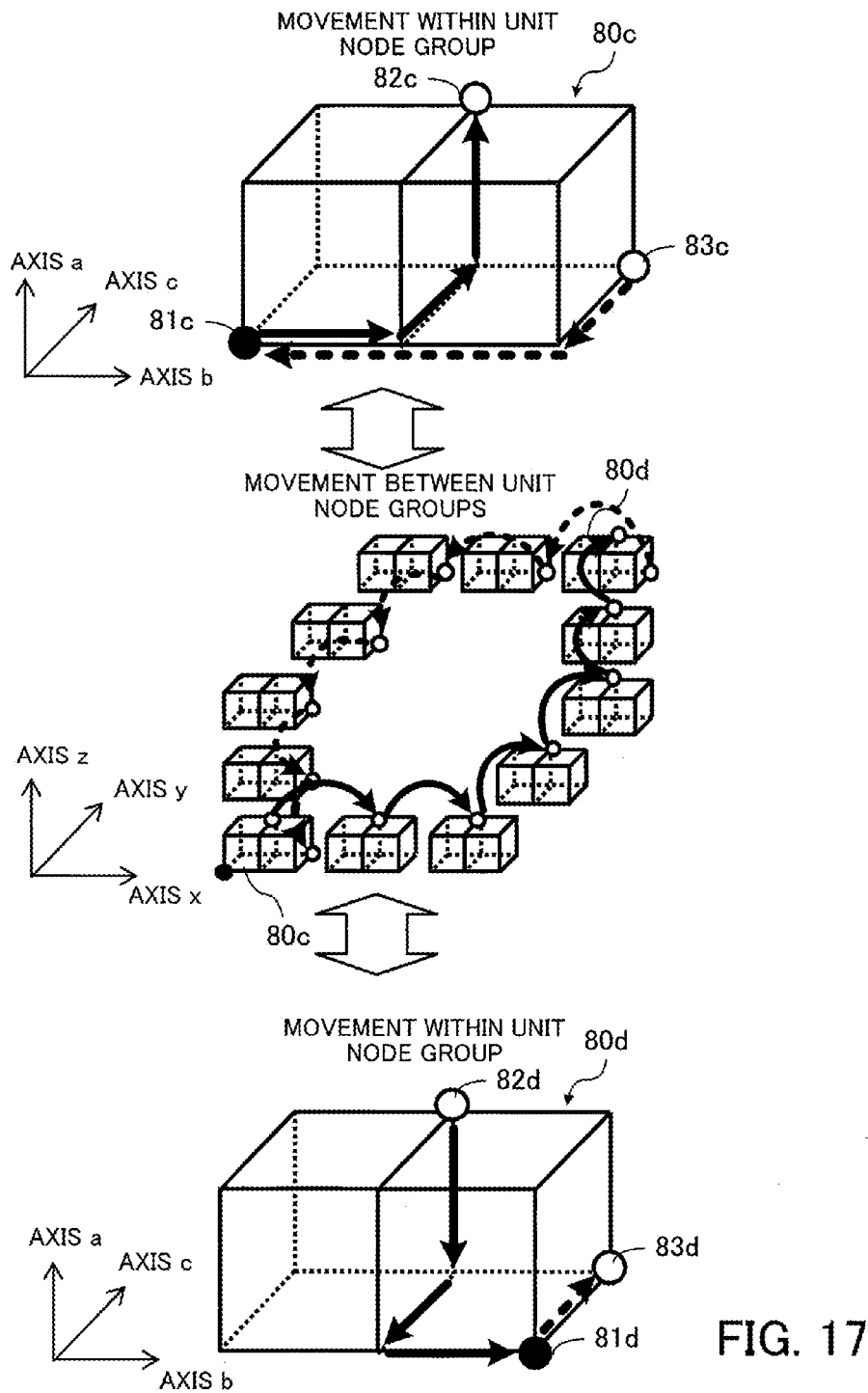
FIG. 17 illustrates an example of inter-node communication.

FIG. 17 illustrates an example of inter-node communication. The following describes the case of performing mutual communication between a node 81c in a node group unit 80c and a node 81d in a node group unit 80d. In FIG. 17, a data movement route from the node 81c to the node 81d is indicated by a solid line, and a data movement route from the node 81d to the node 81c is indicated by a broken line.

The data that moves from the node 81c to the node 81d first moves in the axial directions in the order of axes b, c, and a (bca routing) in the network of the node group unit 80c, and then reaches a node 82c. The data moves from the node 82c, moves between nodes having the position (same coordinates on the axes a, b, and c) corresponding to the node 82c in other node group units (xyz routing), and then reaches a node 82d in the node group unit 80d. Then, the data moves in the axial directions in the order of axes a, c, and b and then reaches the destination node 81d.

The data that moves from the node 81d to the node 81c first moves in the axis-c direction in the network of the node group unit 80d, and then reaches a node 83d. The data moves from the node 83d, moves between the nodes having positions corresponding to the node 83d in other node group units, and then reaches a node 83c in the node group unit 80c. Then, the data moves in the axial directions in the order of axes c and b and then reaches the destination node 81c.

By routing data communication in the way described above, the communication is done successfully in many cases even if a node group unit existing on the data movement route between node group units includes a node with a failed routing function.

Figure 18:
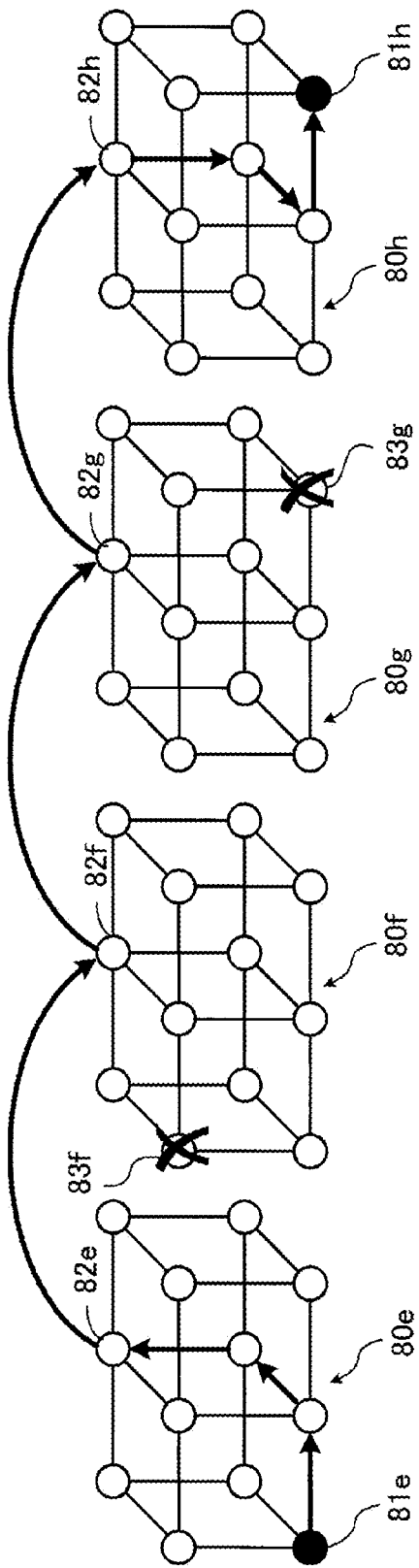
FIG. 18 illustrates an example of inter-node communication in the case where there are nodes with failed routing functions.

FIG. 18 illustrates an example of inter-node communication in the case where there are nodes with failed routing functions. FIG. 18 illustrates an example where data is transferred from a node 81e of a node group unit 80e to a node 81h of a node group unit 80h. The data moves from the node group units 80e to the node group unit 80h via nodes 82e to 82h. Nodes 83f and 83g different from the node 82f and 82g in the node group units 80f and 80g that relay the data have failed, but this does not have an impact on the data communication.

In this way, the communication is possible even when a node group unit that relays data includes a failed node. In the above movement from one node to another, the data passes through nodes located at corresponding positions in the node group units 80e to 80h. Therefore, in the case where each node group unit 80e to 80h includes twelve nodes, there are twelve movement routes between nodes. If all nodes at corresponding positions in the node group units 80e to 80h in at least one of the twelve movement routes are able to perform routing properly, the data movement between the nodes is guaranteeable. In other words, if at least one of the nodes at corresponding positions in the node group units 80e to 80h in all of the twelve movement routes has a failed routing function, the data movement between the nodes is not guaranteeable.

Thus, to confirm whether all-to-all communication is guaranteeable in a BB, the fourth embodiment is designed to project the positions of failures in the routing functions of the nodes represented in the n-dimensional mesh or torus space, onto the u-dimensional submesh or torus. It is determined from the projection result whether all-to-all communication is guaranteeable.

Figure 19:
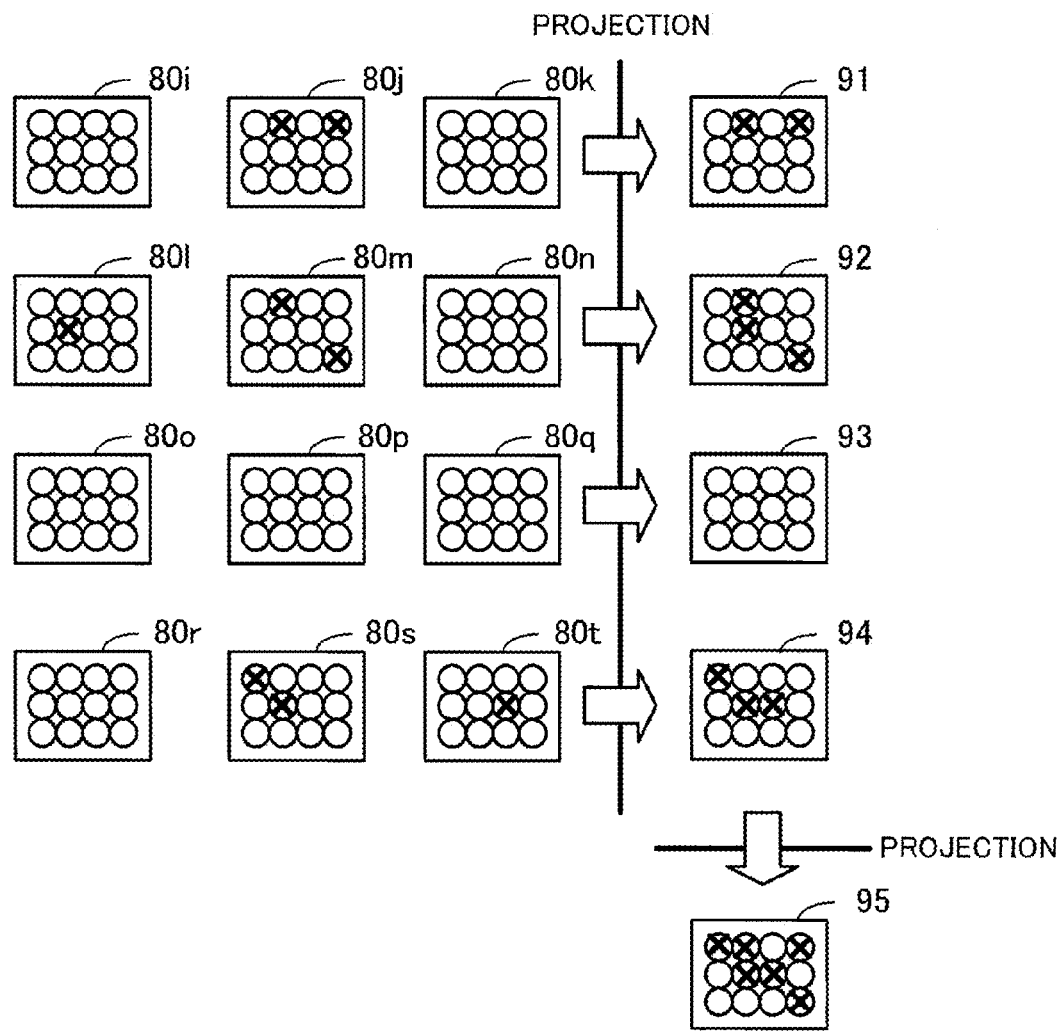
FIG. 19 illustrates an example of projecting the positions of failed nodes.

FIG. 19 illustrates an example of projecting the positions of failed nodes. FIG. 19 illustrates an example where the scheduler 130 projects the positions of failed nodes in the axial direction in which node group units 80i to 80t are arranged, to thereby obtain projection results 91 to 94. The projection results 91 to 94 illustrate flags (cross marks in FIG. 19) each indicating a failure at a position corresponding to the coordinates of a failed node in a node group unit. Then, the scheduler 130 further projects the projection results 91 to 94 to obtain a projection result 95. If the projection result 95 includes no flag indicating a failure at any position, communication between the node group units is guaranteeable by using the nodes at the positions with no flags. If the projection result 95 includes a flag indicating a failure at every position, the communication between the node group units is not guaranteeable.

As described above, when a failure occurs in a routing function, it is possible to easily confirm whether to guarantee communication between all nodes assigned to a job. That is to say, even for the n (=u+v)-dimensional mesh or torus, the confirmation is done by projection onto the u-dimensional space, which means that the dimensions are reduced. This approach makes it possible to guarantee communication between all nodes assigned to one job within an appropriate processing time.

Note that, with respect to a node group unit including a node with a failed routing function, all-to-all communication between the nodes within the node group unit may not be possible.

Figure 20:
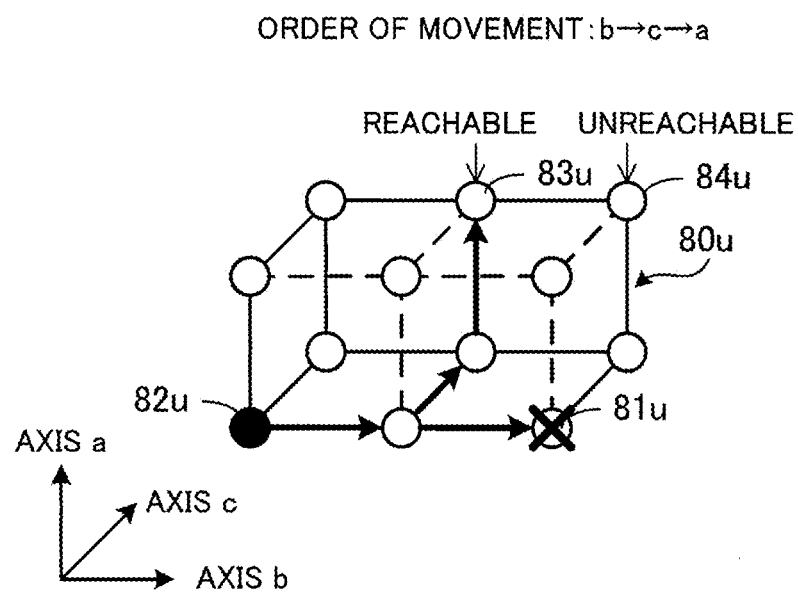
FIG. 20 illustrates an example of communication within a node group unit including a node with a failed routing function.

FIG. 20 illustrates an example of communication within a node group unit including a node with a failed routing function. It is assumed that a failure occurs in the routing function of a node 81*u* in a node group unit 80*u*. In this case, communication from a node 82*u* to a node 83*u* is possible but communication from the node 82*u* to a node 84*u* is not possible.

The scheduler 130 is designed not to assign any nodes in a node group unit including a node with a failed routing function to a job. This eliminates the need of considering the communication status in the node group unit in determining whether all-to-all communication is guaranteeable, thereby making it possible to perform efficient processing.

In this case, whether all-to-all communication is possible is confirmed in the following manner. It is assumed that the system has a six-dimensional mesh or torus network topology for simple explanation. The same approach as described below may be applicable to an n-dimensional mesh or torus.

The coordinates of each node are represented as $(x_0, x_1, x_2, x_3, x_4, x_5)$. It is assumed that packets between nodes are routed such as to move along the following route.

1. Moving in a three-dimensional submesh or torus formed by the axes 3, 4, and 5 (the nodes through which the packets pass have the same coordinates on the axes 0, 1, and 2).
2. Moving in a three-dimensional submesh or torus formed by the axes 0, 1, and 2 (the nodes through which the packets pass have the same coordinates on the axes 3, 4, and 5).
3. Moving in a three-dimensional submesh or torus formed by the axes 3, 4, and 5 (the nodes through which the packets pass have the same coordinates on the axes 0, 1, and 2).

A set of the coordinates of nodes with failed routing functions in the BB is taken as B. In addition, the projection B' of the set B onto the submesh or torus space formed by the axes 3, 4, and 5 is defined as follows:

$$B'=\{(x_3,x_4,x_5) | \forall (x_0,x_1,x_2,x_3,x_4,x_5) \in B\}$$

At this time, it is determined that all-to-all communication is guaranteeable in the case where the following conditions are satisfied:

(Complementary set of B')≠(Empty set); and

Nodes whose $(x_0, x_1, x_2)$ coordinates are all the same as those of any of the nodes with failed routing functions are not assigned to a job.

The scheduler 130 searches for a set of nodes satisfying these conditions with the approach of this embodiment, taking nodes whose $(x_0, x_1, x_2)$ coordinates are all the same as those of any of the nodes with failed routing functions, as unavailable nodes.

In the case where the axis 4 is a torus axis and $S_4=3$, the scheduler 130 determines that all-to-all communication is guaranteeable if the following conditions are satisfied:

$\{x|x \in B, x_4=0\}$=(empty set), or $\{x|x \in B, x_4=1\}$=(empty set)

$\{x|x \in B, x_4=2\}$=(empty set)

As described above, it is possible to efficiently determine whether all-to-all communication is possible, in the case where a network topology is an n (=u+v)-dimensional mesh or torus interconnect.

Note that, if no nodes in a node group unit are available only because the node group unit includes a node with a failed routing function, the use efficiency of nodes deteriorates. In contrast, the scheduler 130 is able to take nodes in a node group unit as available nodes when the routing functions of all of the nodes on a plane of axis b=1 in the node group unit operate properly.

Figure 21:
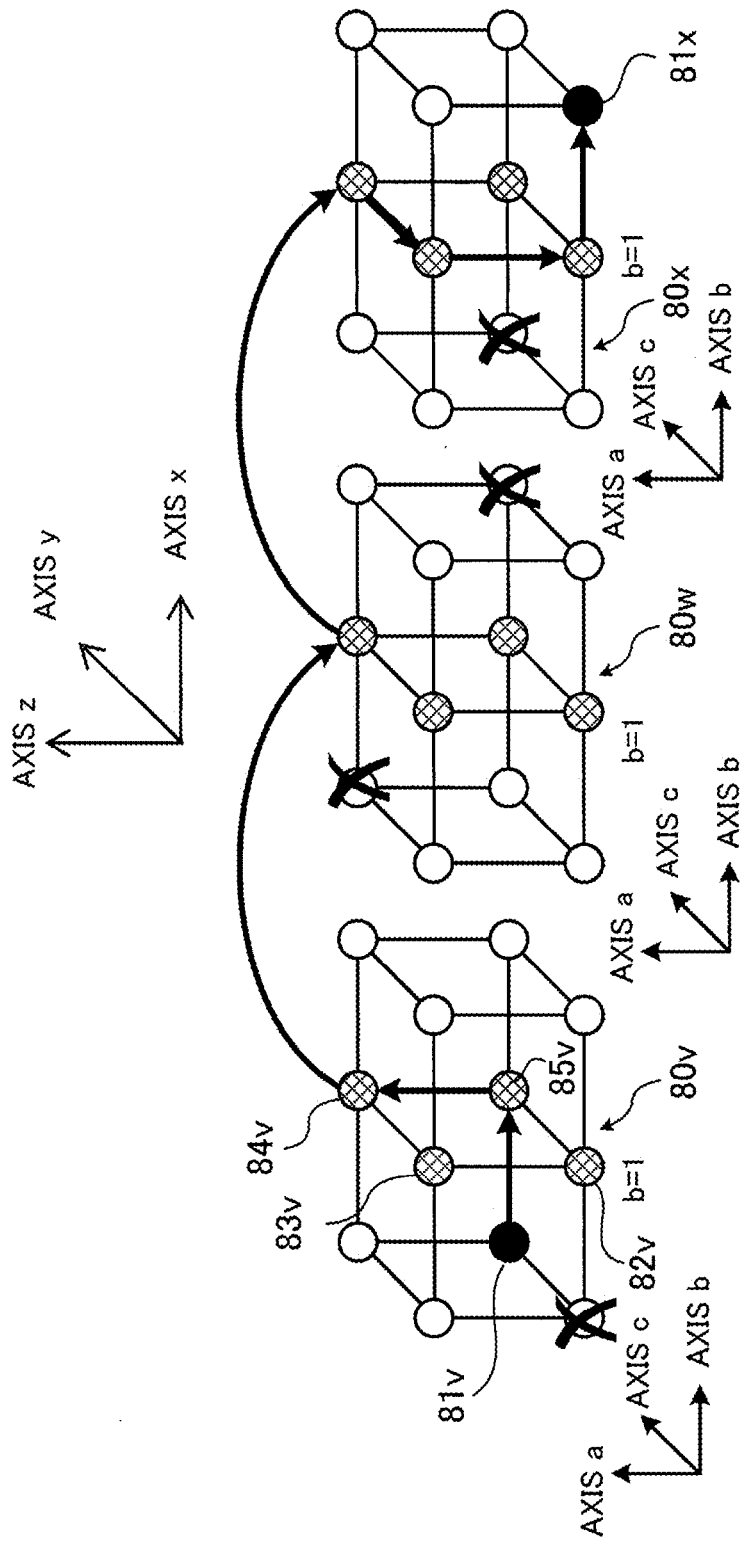
FIG. 21 illustrates an example of node group units where nodes with failed routing functions exist but the other nodes are available.

FIG. 21 illustrates an example of node group units where nodes with failed routing functions exist but the other nodes are available. Each node group unit 80*v*, 80*w*, 80*x* includes one or more nodes each with a failed routing function. If nodes 82*v*, 83*v*, 84*v* and 85*v* on the b=1 plane in the node group unit 80*v* are able to perform routing properly, the other nodes in the node group unit 80*v* are able to communicate with any node on the b=1 plane in one hop. By using any of the nodes 82*v*, 83*v*, 84*v*, and 85*v* on the b=1 plane for communication between node group units, it becomes possible to guarantee communication of the nodes in the node group unit 80*v* with another node, without going through the node with the failed routing function. This applies to the other node group units 80*w* and 80*x*.

That is to say, if all of the nodes on the b=1 plane in each of the node group units 80*v*, 80*w*, and 80*x* are able to perform routing properly, the following routing is guaranteeable.

bca routing: It is possible to move from a transmission source node to the b=1 plane in one hop.

xyz routing: It is possible to move via any of the four nodes on the b=1 plane.

acb routing: It is possible to move from the b=1 plane to a transmission destination node in one hop.

It is understood from the above that it is possible to perform data transmission from a node 81*v* of the node group unit 80*v* to a node 81*x* of the node group unit 80*x*, for example. As a result, it is possible to assign nodes in the node group units 80*v*, 80*w*, and 80*x*, which include nodes with failed routing functions, to a job.

Consider the case where the axis b is used in a torus interconnection. In this case, if all of the nodes on the b=0 plane are able to perform routing properly or all of the nodes on the b=2 plane are able to perform routing properly, the nodes in the node group units 80*v*, 80*w*, and 80*x* are assignable to a job.

As described above, even in the case where a node group unit includes a node with a failed routing function, the other nodes in the node group unit are made available, thereby achieving efficient use of nodes.

FIG. 22 illustrates an example of comparison in the number of available nodes among communication rules. FIG. 22 illustrates the number of available nodes for each of the following four kinds of communication rules.

Rule "ALL": Use certain nodes for the xyz routing (the condition is that a node group unit having a failure is not assignable to a job).

Rule "b0": Use nodes on the b=0 plane for the xyz routing (the condition is that there is no failed node on the b=0 plane in a BB).

Rule "b1": Use nodes on the b=1 plane for the xyz routing (the condition is that there is no failed node on the b=1 plane in a BB).

Rule "b2": Use nodes on the b=2 plane for the xyz routing (the condition is that there is no failed node on the b=2 plane in a BB).

In the case of a node group unit 96, there is no node with a failed routing function. Therefore, all idle nodes are available under any of these rules.

In the case of a node group unit 97, a node on the b=0 plane has a failed routing function. The number of available nodes is zero under the rule "ALL". It is not possible to apply the rule "b0". Nine nodes are available under the rules "b1" and "b2".

In the case of a node group unit 98, a node on the b=2 plane has a failed routing function. The number of available nodes is zero under the rule "ALL". It is not possible to apply the rule "b2". Nine nodes are available under the rules "b0" and "b1".

The use of nodes in a node group unit including a node with a failed routing function in this way promotes the efficient use of the nodes.

The following describes a specific example for BB search in the case where a network topology is 6 (=3+3)-dimensional mesh or torus interconnect, with reference to FIGS. 23 to 25. In the following example, it is assumed that the number of available nodes is counted for each node group unit. In addition, the entire ranges of the axes a, b, and c are used for a BB, and the ranges for the axes x, y, and z are determined in order, taking, out of the axes x, y, and z, the axes given the highest, second-highest, and lowest priority as axes 0, 1, and 2, respectively.

FIG. 23 illustrates an example of how to determine a range for the axis 0. In this example, the requested number of nodes is "250." In addition, all of the axes are used in a mesh interconnection.

Three node group units are arranged in the axis-0 direction. With respect to each of the node group units on the axis 0=0 plane, the axis 0=1 plane, and the axis 0=2 plane, the total number of available nodes is counted. The total number of available nodes in the node group units on the axis 0=0 plane is "20." The total number of available nodes in the node group units on the axis 0=1 plane is "90." The total number of available nodes in the node group units on the axis 0=2 plane is "240."

First, it is determined whether a BB with the width in the axis-0 direction set to one ($s_0=1$) includes the requested number of nodes. In this example, the requested number of nodes is not available in this BB.

Next, it is determined whether a BB with the width in the axis-0 direction set to two ($s_0=2$) includes the requested number of nodes. In this example, the requested number of nodes is available in a BB when the starting position of the range for the axis 0 is set to $x_0=1$. Therefore, the range for the axis 0 is determined to be "$x_0=1$, $s_0=2$."

FIG. 24 illustrates an example of how to determine a range for the axis 1. The numbers of available nodes in the individual node group units for each value of the axis 0 within the determined range of the axis 0 are summed up (merged) for each position on the axis 1-axis 2 plane.

Five node group units are arranged in the axis-1 direction. The total number of available nodes in the node group units on the axis 1=0 plane is "73." The total number of available nodes in the node group units on the axis 1=1 plane is "89." The total number of available nodes in the node group units on the axis 1=2 plane is "68." The total number of available nodes in the node group units on the axis 1=3 plane is "48." The total number of available nodes in the node group units on the axis 1=4 plane is "52."

First, while gradually extending the width in the axis-1 direction from one ($s_1=1$), it is determined whether a generated BB includes the requested number of nodes. In this example, the requested number of nodes is not available in any BB with the width in the axis-1 direction set to one ($s_1=0$) to three ($s_1=2$).

Next, it is determined whether a BB with the width in the axis-1 direction set to four ($s_1=4$) includes the requested number of nodes. In this example, the requested number of nodes is available in a BB when the starting position of the range for the axis 1 is set to $x_1=0$. Therefore, the range for the axis 1 is determined to be "$x_1=0$, $s_1=4$."

FIG. 25 illustrates an example of how to determine a range for the axis 2. The numbers of available nodes in the individual node group units for each value of the axis 1 within the determined range of the axis 1 are summed up (merged) for each position on the axis 2.

Four node group units are arranged in the axis-2 direction. The total number of available nodes in the node group units at the axis 2=0 is "71." The total number of available nodes in the node group units at the axis 2=1 is "63." The total number of available nodes in the node group units at the axis 2=2 is "79." The total number of available nodes in the node group units at the axis 2=3 is "65."

First, while gradually extending the width in the axis-2 direction from one ($s_2=1$), it is determined whether a generated BB includes the requested number of nodes. In this example, the requested number of nodes is not available in any BB with the width in the axis-2 direction set to one ($s_2=1$) to three ($s_2=3$).

Next, it is determined whether a BB with the width in the axis-2 direction set to four ($s_2=4$) includes the requested number of nodes. In this example, the requested number of nodes is available in a BB when the starting position of the range for the axis 2 is set to $x_2=0$. Therefore, the range for the axis 2 is determined to be "$x_2=0$, $s_2=4$." As a result, the region of the BB is determined to be "x (1, 0, 0), s(2, 4, 4)."

By gradually extending a width from a narrow range in each axial direction to determine the region of a BB as described above, it is possible to generate the smallest BB that includes available nodes more than or equal to the requested number of nodes. As a result, it is possible for nodes assigned to a job to perform communication therebetween efficiently, which improves the processing efficiency. In addition, since a BB is allowed to include unavailable nodes, it is possible to increase the size of the BB such as to include available nodes more than or equal to the requested number of nodes, which leads to efficient use of nodes.

According to one aspect, it is possible to minimize degradation of inter-node communication performance while achieving efficient use of nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   sequentially selecting, in response to a job execution request specifying a requested number of nodes for a job, an axis of attention for range determination from n axes of an n-dimensional space, the n being an integer of two or greater, the n-dimensional space forming a network where a plurality of nodes are connected by one of a mesh interconnect and a torus interconnect;
   gradually extending a width of a temporary range of coordinates of the axis of attention from a prescribed value based on n-dimensional coordinates and status information of the plurality of nodes, and determining, as a range of coordinates for the axis of attention, the temporary range in which a number of available nodes whose coordinates on each defined axis fall within a determined range of said each defined axis and whose coordinates on the axis of attention fall within the temporary range is greater than or equal to the requested number of nodes, the status information indicating a status including whether each of the plurality of nodes is available, said each defined axis being an axis whose range has been determined; and determining, after determining ranges of coordinates for all of the n axes, second nodes to be assigned to the job from first nodes whose coordinates on each of the n axes fall within a determined range of said each of the n axes and which are available.

2. The non-transitory computer-readable storage medium according to claim 1, wherein:

the status information indicates whether there is a failure in the plurality of nodes;

the process further includes determining, after determining the ranges for all of the n axes, based on the n-dimensional coordinates and the status information of the plurality of nodes whether all-to-all communication between the first nodes is guaranteeable; and the determining second nodes includes determining the seconds nodes from the first nodes when the all-to-all communication is determined to be guaranteeable.

3. The non-transitory computer-readable storage medium according to claim 2, wherein:

the determining as a range includes re-determining, upon determining that the all-to-all communication is not guaranteeable, the ranges so as to change the ranges for some or all of defined axes whose ranges have been determined.

4. The non-transitory computer-readable storage medium according to claim 2, wherein, when a position of the temporary range of coordinates of the axis of attention is shifted with the width of the temporary range unchanged and all shifted positions are where the all-to-all communication between the first nodes is determined not to be guaranteeable, the determining as a range includes canceling the determining of the range for the axis of attention and re-determining the ranges so as to change the ranges for some or all of defined axes whose ranges have been determined.

5. The non-transitory computer-readable storage medium according to claim 2, wherein:

the network includes a first network and a second network, the first network being a network where nodes in a node group unit are connected by one of a u-dimensional mesh interconnect and a u-dimensional torus interconnect, the u being an integer of one or greater, the node group unit being a set of nodes, the second network being a network where a plurality of node group units are connected by one of a v-dimensional mesh interconnect and a v-dimensional torus interconnect and nodes having same u-dimensional coordinates in adjacent node group units are connected to each other, the v being an integer of one or greater; and the determining whether all-to-all communication is guaranteeable includes determining that all-to-all communication between node group units in the second network is guaranteeable when u-dimensional coordinates of individual nodes in the plurality of node group units include one or more coordinates that do not overlap with u-dimensional coordinates of each failed node with a failed routing function in the plurality of node group units.

6. The non-transitory computer-readable storage medium according to claim 1, wherein:

the determining as a range includes taking an entire range of coordinates of the axis of attention as the prescribed value for the width of the temporary range when a result of subtracting a number of available nodes whose coordinates on said each defined axis fall within the determined range and whose coordinates on the axis of attention are a prescribed coordinate from a number of available nodes whose coordinates on said each defined axis fall within the determined range does not reach the requested number of nodes.

7. A job management method comprising:

sequentially selecting, by a processor, in response to a job execution request specifying a requested number of nodes for a job, an axis of attention for range determination from n axes of an n-dimensional space, the n being an integer of two or greater, the n-dimensional space forming a network where a plurality of nodes are connected by one of a mesh interconnect and a torus interconnect;

gradually extending, by the processor, a width of a temporary range of coordinates of the axis of attention from a prescribed value based on n-dimensional coordinates and status information of the plurality of nodes, and determining, as a range of coordinates for the axis of attention, the temporary range in which a number of available nodes whose coordinates on each defined axis fall within a determined range of said each defined axis and whose coordinates on the axis of attention fall within the temporary range is greater than or equal to the requested number of nodes, the status information indicating a status including whether each of the plurality of nodes is available, said each defined axis being an axis whose range has been determined; and determining, by the processor, after determining ranges of coordinates for all of the n axes, second nodes to be assigned to the job from first nodes whose coordinates on each of the n axes fall within a determined range of said each of the n axes and which are available.

8. A job management apparatus comprising:

a memory that stores n-dimensional coordinates and status information of a plurality of nodes in a network where the plurality of nodes are connected by one of a mesh interconnect and a torus interconnect, the n being an integer of two or greater, the status information indicating a status including whether each of the plurality of nodes is available; and a processor that performs a process including:

sequentially selecting, in response to a job execution request specifying a requested number of nodes for a job, an axis of attention for range determination from n axes of an n-dimensional space forming the network;

gradually extending a width of a temporary range of coordinates of the axis of attention from a prescribed value based on the n-dimensional coordinates and the status information of the plurality of nodes, and determining, as a range of coordinates for the axis of attention, the temporary range in which a number of available nodes whose coordinates on each defined axis fall within a determined range of said each defined axis and whose coordinates on the axis of attention fall within the temporary range is greater than or equal to the requested number of nodes, said each defined axis being an axis whose range has been determined; and determining, after determining ranges of coordinates for all of the n axes, second nodes to be assigned to the job from first nodes whose coordinates on each of the n axes fall within a determined range of said each of the n axes and which are available.

* * * * *